(12) United States Patent
Park

(10) Patent No.: US 11,457,415 B2
(45) Date of Patent: Sep. 27, 2022

(54) METHOD AND APPARATUS FOR CONTROLLING TRANSMISSION POWER OF UPLINK DATA CHANNEL

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/043,566

(22) PCT Filed: Mar. 29, 2019

(86) PCT No.: PCT/KR2019/003709
§ 371 (c)(1),
(2) Date: Sep. 29, 2020

(87) PCT Pub. No.: WO2019/190265
PCT Pub. Date: Oct. 3, 2019

(65) Prior Publication Data
US 2021/0029646 A1    Jan. 28, 2021

(30) Foreign Application Priority Data

Mar. 30, 2018 (KR) .................. 10-2018-0037376
Apr. 2, 2018 (KR) .................. 10-2018-0038304
Mar. 28, 2019 (KR) .................. 10-2019-0036129

(51) Int. Cl.
*H04W 52/14* (2009.01)
*H04W 52/54* (2009.01)

(52) U.S. Cl.
CPC ......... *H04W 52/146* (2013.01); *H04W 52/54* (2013.01)

(58) Field of Classification Search
CPC .............................................. H04W 52/00–60
See application file for complete search history.

(56) References Cited

U.S. PATENT DOCUMENTS

2014/0204854 A1* 7/2014 Freda .................. H04W 72/042
370/329
2017/0272299 A1 9/2017 Chae et al.
(Continued)

FOREIGN PATENT DOCUMENTS

WO    2017/196025 A2    11/2017

OTHER PUBLICATIONS

Intel Corporation, "Handling UL transmissions with different reliability requirements", R1-1802424, 3GPP TSG RAN WG1 Meeting #92, Athens, Greece, Feb. 26-Mar. 2, 2018, pp. 1-6.
(Continued)

*Primary Examiner* — Raymond S Dean
(74) *Attorney, Agent, or Firm* — Invenstone Patent, LLC

(57) ABSTRACT

Provided are methods and apparatuses for efficiently multiplexing one or more UL data transmission resource(s) between UEs with different latency requirements or efficiently controlling power of one or more UL data transmission resource(s) between UEs with different latency requirements, in the NR. The method of the UE for controlling transmission power of UP data channel may include applying predetermined power control, which is different from another, for transmitting an UL data channel and transmitting the UL data channel based on the applied predetermined power control.

5 Claims, 25 Drawing Sheets

(56) References Cited

U.S. PATENT DOCUMENTS

| | | | |
|---|---|---|---|
| 2018/0007673 A1* | 1/2018 | Fwu | H04L 5/0092 |
| 2018/0115928 A1* | 4/2018 | Kim | H04W 36/14 |
| 2018/0219716 A1 | 8/2018 | Chae et al. | |
| 2018/0288756 A1* | 10/2018 | Xia | H04B 7/0695 |
| 2019/0098612 A1* | 3/2019 | Babaei | H04W 72/1289 |
| 2019/0150097 A1 | 5/2019 | Seo et al. | |
| 2019/0261281 A1* | 8/2019 | Jung | H04W 52/146 |
| 2019/0349864 A1* | 11/2019 | Zhang | H04W 52/42 |
| 2019/0349922 A1* | 11/2019 | Xu | H04L 5/0092 |
| 2019/0379569 A1 | 12/2019 | Chae et al. | |
| 2020/0052951 A1 | 2/2020 | Chae et al. | |

OTHER PUBLICATIONS

Vivo, "Summary of 7.3.3.6 multiplexing data with different transmission durations", R1-1801155, 3GPP TSG RAN WG1 Meeting AH 1801, Vancouver, Canada, Jan. 22-26, 2018, pp. 1-8.

Zte et al., "sPUSCH power control", R1-1717708, 3GPP TSG RAN WG1 Meeting #90bis, Prague, Czech Republic, Oct. 9-13, 2017, pp. 1-3.

* cited by examiner

METHOD AND APPARATUS FOR CONTROLLING TRANSMISSION POWER OF UPLINK DATA CHANNEL

CROSS REFERENCE TO RELATED APPLICATIONS

This application is a National Stage Patent Application of PCT International Patent Application No. PCT/KR2019/003709 (filed on Mar. 29, 2019) under 35 U.S.C. § 371, which claims priority to Korean Patent Application Nos. 10-2018-0037376 (filed on Mar. 30, 2018), 10-2018-0038304 (filed on Apr. 2, 2018), and 10-2019-0036129 (filed on Mar. 28, 2019), the teachings of which are incorporated herein in their entireties by reference.

TECHNICAL FIELD

The present disclosure relates to methods and apparatuses for controlling transmission power of an uplink data channel in a next-generation/5G radio access network (hereinafter, referred to as a new radio, "NR").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

DETAILED DESCRIPTION OF THE INVENTION

Technical Problem

It is at least one object of the present disclosure to provide methods and apparatuses for efficiently controlling transmission power of an uplink ("UL") data channel in the NR.

Technical Solution

To address such issues, in accordance with one aspect of the present disclosure, a method of a user equipment ("UE") is provided for controlling transmission power of an UL data channel. The method may include: transmitting an UL data channel according to a first transmission power control, receiving an UL discontinuous TPC command, and adjusting transmission power of an UL data channel being transmitted with a second transmission power control based on the UL discontinuous TPC command. Further, a method of a base station is provided of controlling an UL data channel of a UE. The method may include: configuring monitoring configuration information for an UL discontinuous TPC command, transmitting the monitoring configuration information to the UE that is transmitting the UL data channel, and transmitting the UL discontinuous TPC command based on the monitoring configuration information.

In accordance with another aspect of the present disclosure, a UE is provided of transmitting UL data comprising. The UE may include: a transmitter transmitting an UL data channel according to a first transmission power control, a receiver receiving an UL discontinuous TPC command, and a controller adjusting transmission power of the UL data channel being transmitted with a second transmission power control based on the UL discontinuous TPC command.

In accordance with further another aspect of the present disclosure, a base station is provided of controlling an UL data channel of a UE. The base station may include: a controller configuring monitoring configuration information for an UL discontinuous TPC command, a transmitter transmitting the monitoring configuration information to the UE that is transmitting the UL data channel and transmitting the UL discontinuous TPC command based on the monitoring configuration information.

In accordance with yet another aspect of the present disclosure, a method of a UE is provided for controlling transmission power of an UL data channel. The method may include: applying a power control different from another for a transmission of an UL data channel, and transmitting the UL data channel to which the power control different from another is applied.

In accordance with yet another aspect of the present disclosure, a method of a base station is provided for receiving an UL data channel. The method may include: explicitly transmitting, or implicitly indicating, control information for indicating a power control different from another to an UL data channel to a UE, and receiving the UL data channel to which the power control different from another is applied.

In accordance with yet another aspect of the present disclosure, a UE is provided for controlling transmission power of an UL data channel. The UE may include: a controller applying a power control different from another to an UL data channel, and a transmitter transmitting the UL data channel to which the power control different from another is applied.

In accordance with yet another aspect of the present disclosure, a base station is provided for receiving an UL data channel. The base station may include: a transmitter explicitly transmitting, or implicitly indicating, control information for indicating a power control different from another to an UL data channel to a UE, and a receiver receiving the UL data channel to which the power control different from another is applied.

Effects of the Invention

In accordance with embodiments of the present disclosure, it is possible efficiently to control transmission power of an UL data channel in the NR.

BEST MODE FOR CARRYING OUT THE INVENTION

Figure 1:
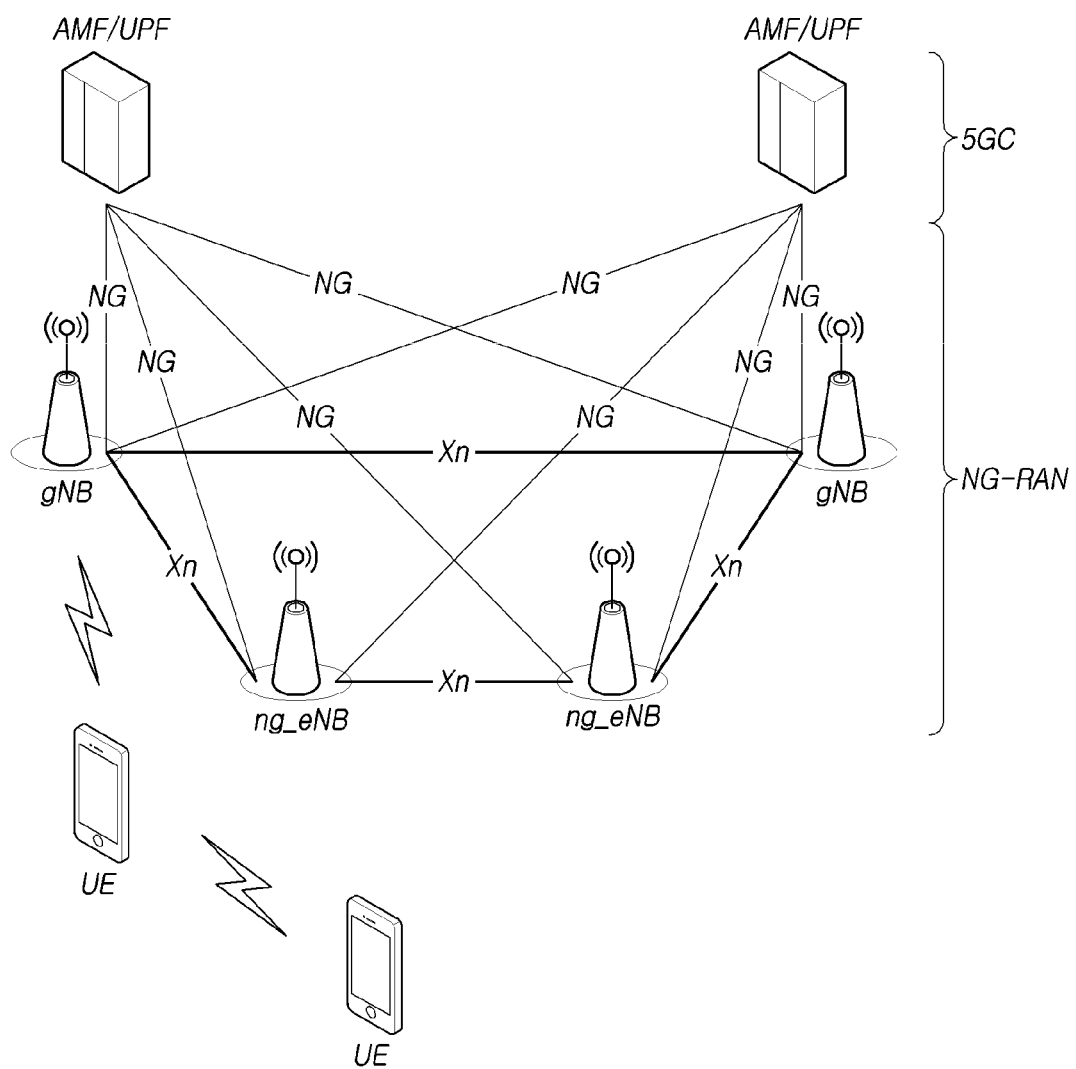
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided. The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as $3^{rd}$ generation partnership project (3GPP), 3GPP2, WiFi, Bluetooth, institute of electrical and electrics engineers ((IEEE), international telecommunication unit (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Furthermore, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility.

The primary technical features of NR will be described below with reference to the drawings.

<Overview of NR System>

FIG. 1 schematically illustrates an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT-s)-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols.

Figure 2:
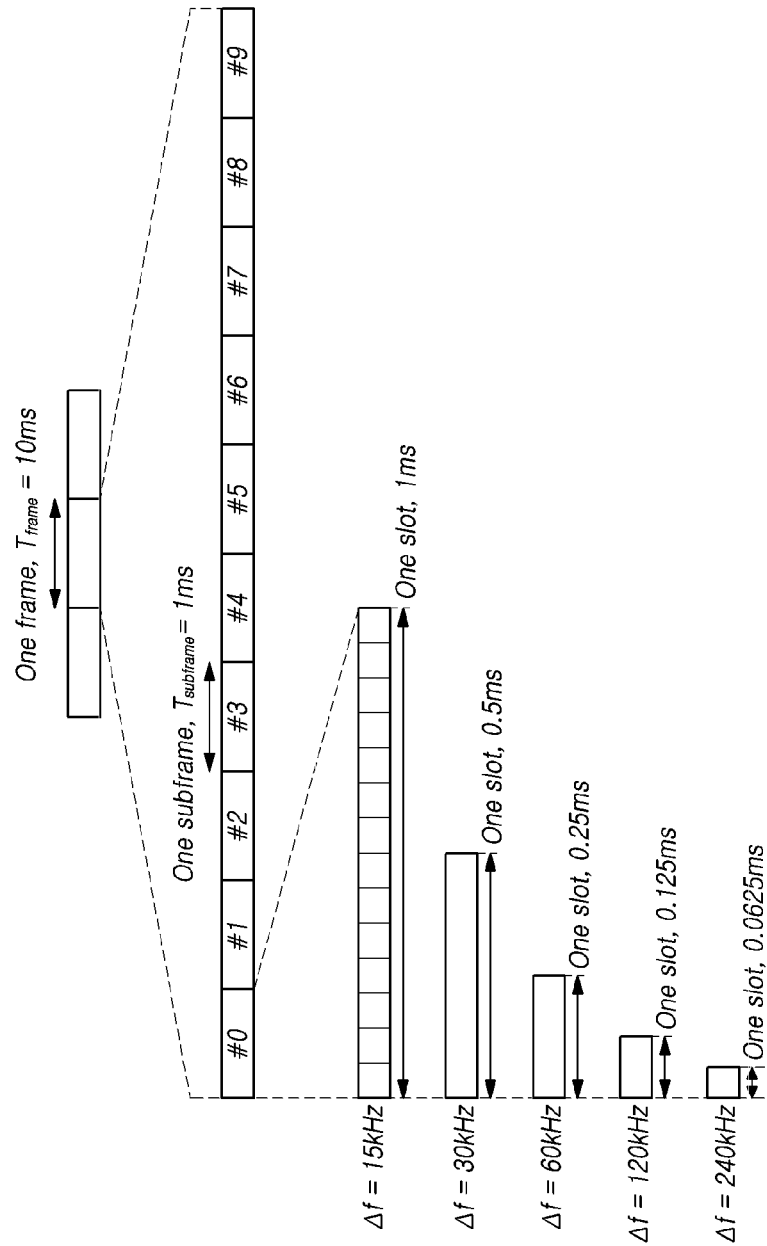
FIG. 2 schematically illustrates a frame structure in an NR system in accordance with embodiments of the present disclosure.

FIG. 2 illustrates a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically inform the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
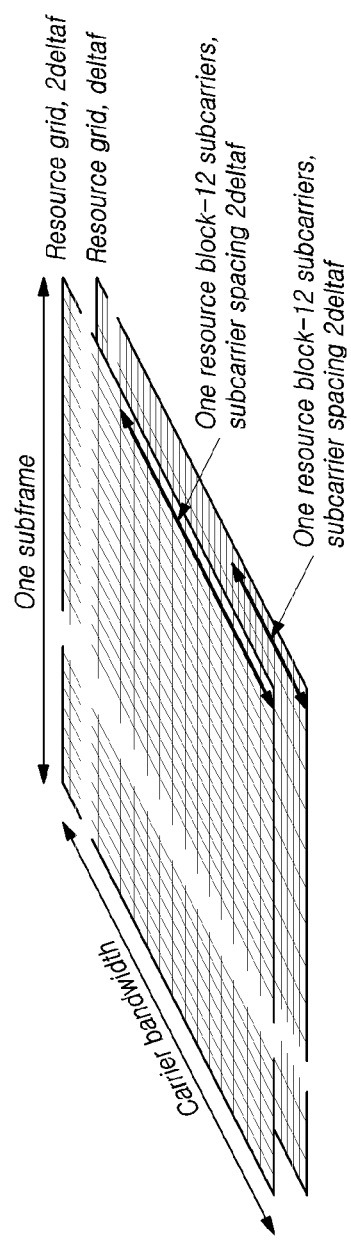
FIG. 3 illustrates resource grids supported by a radio access technology in accordance with embodiments of the present disclosure.

FIG. 3 is a view for explaining resource grids supported by a radio access technology.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
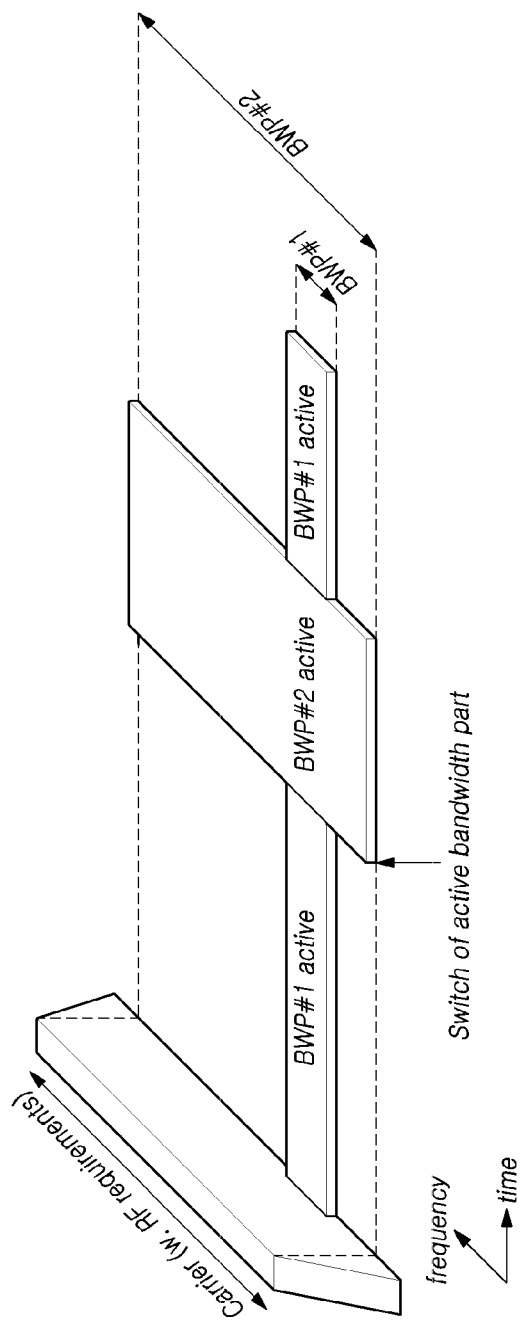
FIG. 4 illustrates bandwidth parts supported by a radio access technology in accordance with embodiments of the present disclosure.

FIG. 4 is a view for explaining bandwidth parts supported by a radio access technology.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
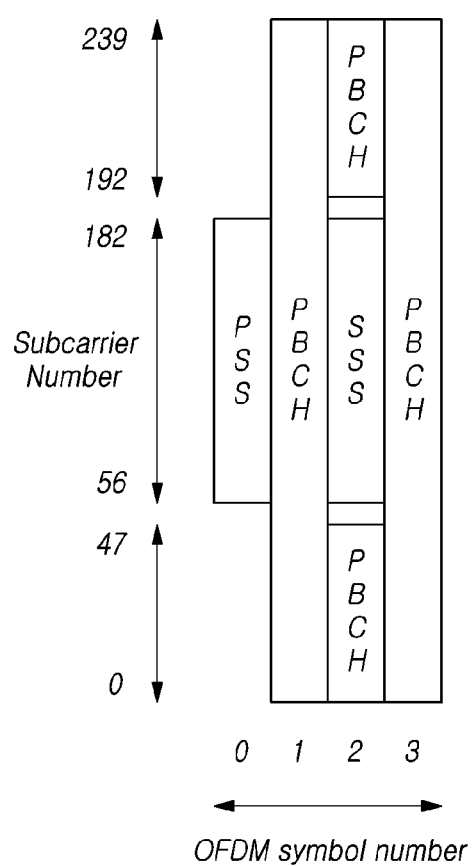
FIG. 5 illustrates an example of a synchronization signal block in a radio access technology in accordance with embodiments of the present disclosure.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
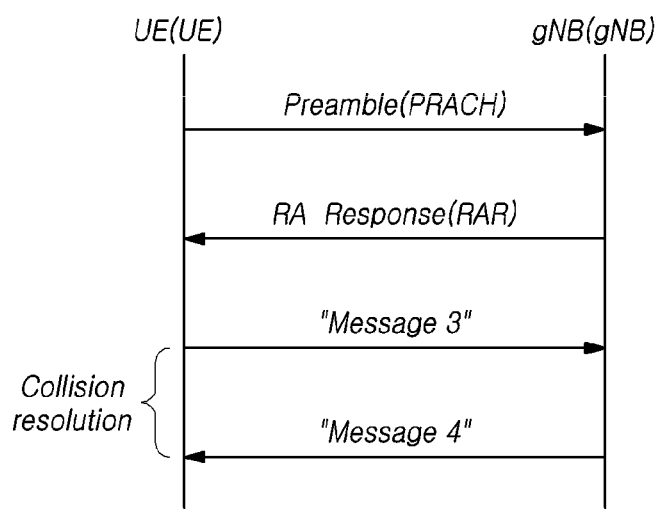
FIG. 6 is a signal diagram for explaining a random access procedure in a radio access technology in accordance with embodiments of the present disclosure.

FIG. 6 illustrates a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
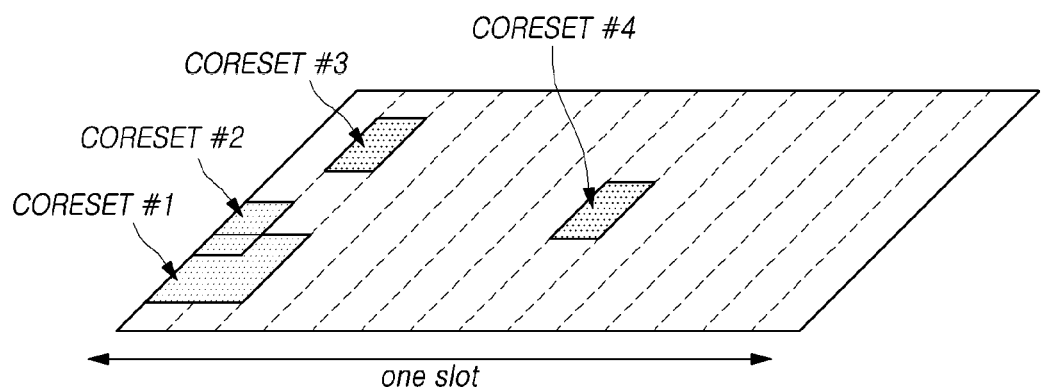
FIG. 7 illustrates CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+an UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 8:
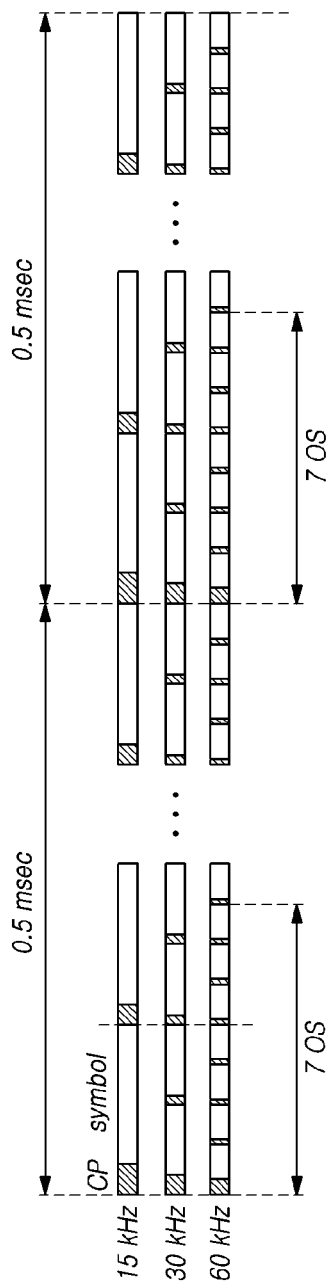
FIG. 8 is a diagram for describing symbol level alignment among different subcarrier spacings (SCSs) in accordance with embodiments of the present disclosure. (Please note that this sentence is not in Korean Application. Please add this sentence through the Preliminary Amendments)

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

PDCCH

In NR and LTE/LTE-A systems, L1 control information, such as, DL assignment DL control information (DCI), UL grant DCI, and the like, are transmitted and/or received through a PDCCH. A control channel element (CCE) is defined as a resource unit for the transmitting of the PDCCH. In the NR, a control resource set (CORESET) that is a frequency/time resource for PDCCH transmission may be configured for each UE. Further, each CORESET may include one or more search spaces configured with one or more PDCCH candidates for allowing a UE to monitor the PDCCH.

Power Control

In NR and LTE/LTE-A systems, UL transmission power of a UE is determined based on a maximum transmission power value of the UE, a higher layer parameter, path loss, a TPC command value transmitted through a DL control channel, and the like.

UL Transmission Procedure

Taking account of requirements for transmission delay and coverage, an UL control channel in the NR is classified into a short PUCCH structure and a long PUCCH structure for supporting different symbol lengths. Further, taking account of flexible resource configuration methods at a symbol level, various options are provided for a symbol length and a start symbol location of the PUCCH. Further, some functions are supported, such as an on/off-control DM-RS overhead configuration for frequency hopping of the PUCCH, and the like.

The NR defines various types of PUSCH transmission methods, such as non-slot-based (i.e. minislot based) PUSCH transmission and it's mapping type B (e.g., a DM-RS transmission type), aggregated-slot-based PUSCH transmission, grant-free PUSCH transmission, and the like in addition to UL-grant-based slot-based PUSCH transmission and it's mapping type (e.g., DM-RS transmission type) which is identical to the PUSCH resource allocation method of the LTE/LTE-A system and PUSCH transmission operations of a UE.

<Wider Bandwidth Operations>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a typical LTE UE supports a transmission/reception capability of a bandwidth of 20 MHz for a single LTE CC.

Figure 9:
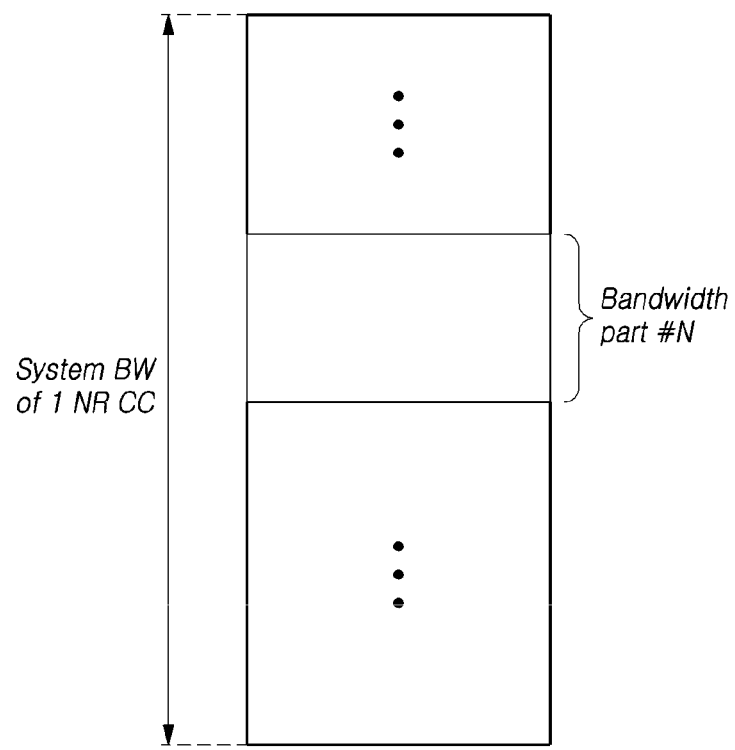
FIG. 9 schematically illustrates a bandwidth part in accordance with embodiments of the present disclosure.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

Embodiment 1

Discontinuous Transmission Indication for DL

NR introduces a method of indicating discontinuous transmission through a group common PDCCH, as a multiplexing method for DL data of a transmission duration different from another. That is, when a UE receives indication information for discontinuous transmission, the UE is able to identify the presence or absence of preemption for data transmission of one or more other UE(s) for a part time/frequency resource of a PDSCH transmission resource allocated for the UE according to the indication information.

In accordance with embodiments of the present disclosure, methods are provided for transmitting and/or receiving an UL data channel based on preemption for efficiently multiplexing an UL data transmission resource between UEs with different latency requirements.

As usage scenarios introduced by NR and LTE/LTE-A systems, there is increasing importance for an efficient supporting method for data related to the URLLC service requiring low-latency/high-reliability, along with data support related to the eMBB service to maximize data transmission rate, In particular, in order to satisfy the latency requirement, in the case of UL data transmission for the URLLC, the UL data transmission may be performed by preempting a part of an UL data transmission resource, which has been scheduled for one or more other UE(s), in a similar way to the DL case described above. For example, during on-going UL data transmission by an eMBB UE, when UL data transmission of an URLLC UE that is sensitive to the latency requirement is required, the URLLC UE may transmit the corresponding UL data by preempting a part of an UL data transmission resource of the eMBB UE.

To do this, in order to suspend UL data channel (PUSCH) transmission of a UE that is currently transmitting UL data and support an UL cancellation indication for enabling the corresponding resource is to be used for UL data transmission of the URLLC UE, it is necessary to define specific operating methods of the UE for this.

In present disclosure, for convenience of description, the term "UL (uplink) cancellation indication" is used; however, embodiments of the present disclosure are not limited to such a specific term. The UL cancellation indication may be referred to as an UL preemption indication, a discontinuous UL transmission indication, a suspending UL transmission indication, or the like; however, embodiments of the present disclosure are not limited to such terms.

Embodiment 1-1 Configuring Monitoring Information for UL Cancellation Indication A UE-specific DCI format for an UL cancellation indication may be defined, as a method for transmitting UL cancellation indication information. In this case, the UL cancellation indication information may be defined to be transmitted to each UE through a UE-specific PDCCH transmitted through a UE-specific CORESET or a UE-specific search space for each UE.

A UE-group common DCI format for an UL cancellation indication may be defined, as another method for transmitting UL cancellation indication information. In this case, the UL cancellation indication information may be defined to be transmitted to each UE through a UE-group common PDCCH transmitted through a UE-group common CORESET or a UE-group common search space, configured for a UE-group.

Thus, when UL cancellation indication information for a UE is defined as being transmitted through a UE-specific PDCCH or a UE-group common PDCCH, a base station/network may be configured to monitor an UL cancellation indication through UE-specific higher layer signaling or cell-specific/UE-group common higher layer signaling for the UE. In this case, the monitoring for the UL cancellation indication may be performed independently from whether the monitoring of DL preemption indication is configured.

In another embodiment, the UL cancellation indication may be indicated based on a specific sequence, in addition to being transmitted through a PDCCH in the form of DCI (UE-specific or group-common). For example, the specific sequence may be pre-configured, or be configured based on a specific factor, such as a cell ID, a UE ID, a bandwidth, or the like.

Specifically, monitoring configuration information for an UL cancellation indication may include control resource set (CORESET) and search space configuration information for monitoring for corresponding UL cancellation indication information, radio network temporary identifier (RNTI) configuration information, monitoring period configuration information, and the like.

Embodiment 1-2 An Operating Method of a UE when UL Cancellation Indication Information is Received

Embodiment 1-2-1 A Method of Suspending Remaining PUSCH Transmission

A UE that receives the UL cancellation indication information described above may be defined not to perform PUSCH transmission in one or more remaining OFDM symbol(s) of resources allocated for a PUSCH being transmitted, that is, to suspend the PUSCH transmission.

Figure 10:
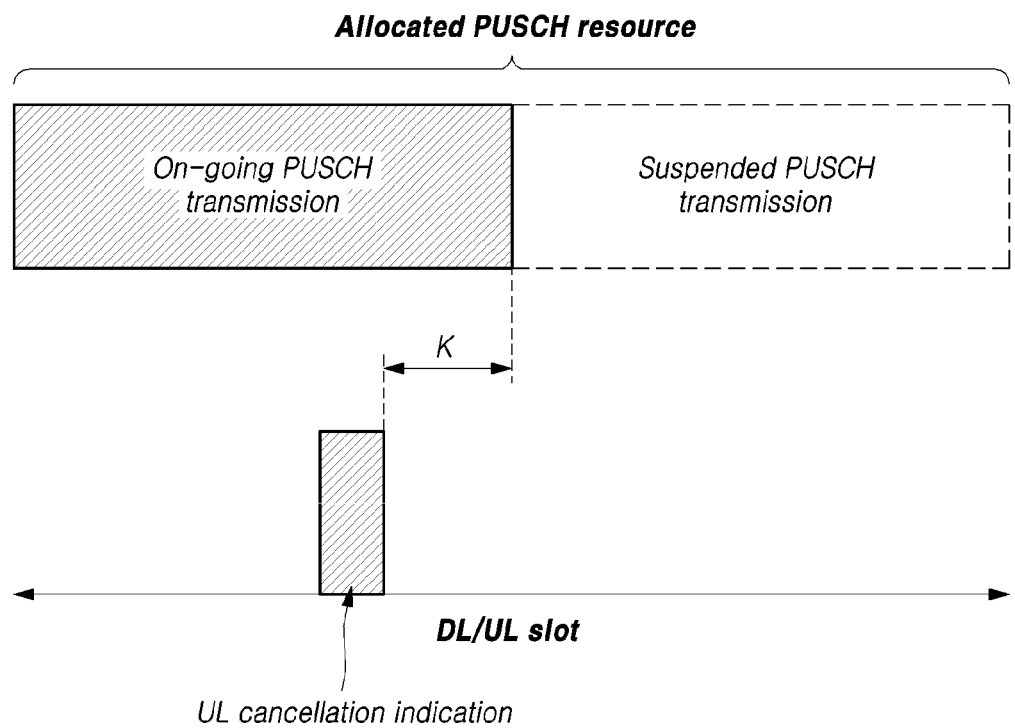
FIG. 10 illustrates an example of UL cancellation in accordance with Embodiment 1.

Specifically, as illustrated in FIG. 10, a UE that receives UL cancellation indication may be defined to suspend all PUSCH transmission(s) after a timing gap, k, corresponding to a pre-configured latency period from a time at which the UL cancellation indication information transmission is performed. Here, the time at which the UL cancellation indication information transmission is performed, may mean a last symbol over which the UL cancellation indication information is transmitted or an UL symbol corresponding to the last symbol over which the UL cancellation indication information is transmitted.

At this time, the K value may be defined to be set by a base station/network and transmitted to a UE through explicit signaling. For example, the K value may be set by the base station/network and transmitted to the UE through UE-specific higher layer signaling or cell-specific/UE-group common higher layer signaling. As another example, the K value may be dynamically set through L1 control signaling by being included in corresponding UL cancellation indication information and transmitted to the UE, by the base station/network.

As further another example of defining the K value, the K value may be defined to be implicitly set by capabilities of the UE. Alternatively, the base station/network may be defined to set it and, as described above, transmit it to the UE through explicit signaling.

As yet another example of defining the K value, the K value may be implicitly determined. For example, the K value may be defined to be determined as i) a function of a numerology or ii) an SCS value of DL or UL. As another example, K value may be defined to be determined as a function of a monitoring period value of a cancellation indication.

FIG. 10 illustrates PUSCH resource allocated within a slot boundary in accordance with an embodiment. That is, in accordance with this case, slot-based or minislot(non-slot)-based PUSCH resource allocation may be performed. A UE may perform PUSCH transmission through a slot allocated for the PUSCH transmission. When UL cancellation indication is received, the UE may suspend the PUSCH transmission in one or more remaining symbol(s) within the slot boundary of a corresponding slot after a symbol corresponding to a K value, which is a latency period.

Figure 11:
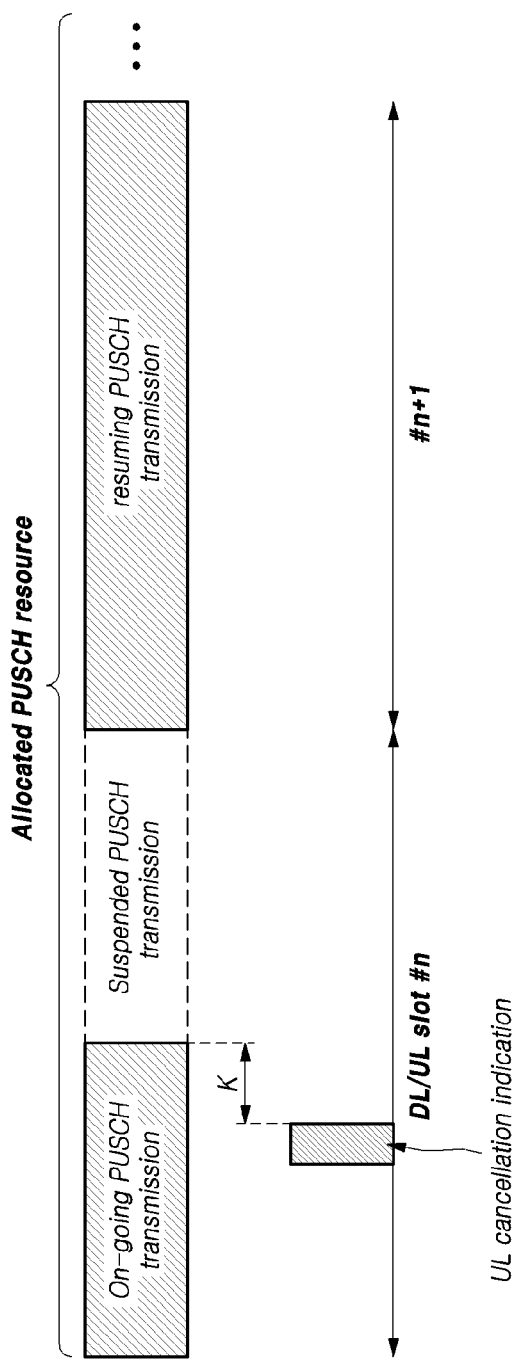
FIG. 11 illustrates another example of UL cancellation in accordance with Embodiment 1.

FIG. 11 illustrates PUSCH resource allocated based on a plurality of aggregated slots in accordance with another embodiment. In this case, a UE may suspend only remaining PUSCH transmission within the slot boundary of a slot (#n) over which UL cancellation indication is received. Thereafter, the UE may normally perform the PUSCH transmission through one or more remaining allocated slot(s) (from #n+1).

Figure 12:
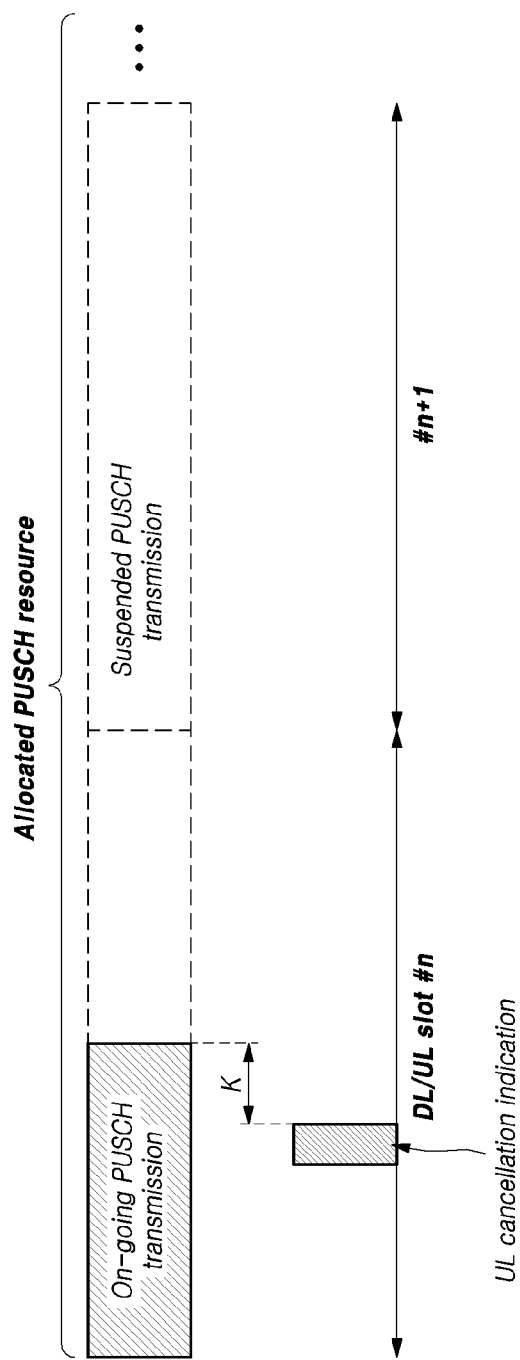
FIG. 12 illustrates still another example of UL cancellation in accordance with Embodiment 1.

FIG. 12 illustrates PUSCH resource allocated based on a plurality of aggregated slots according to further another embodiment. In this case, a UE may suspend all remaining PUSCH transmission(s) for a slot (#n) over which UL cancellation indication is received and aggregated slots therefrom (from #n+1).

Figure 13:
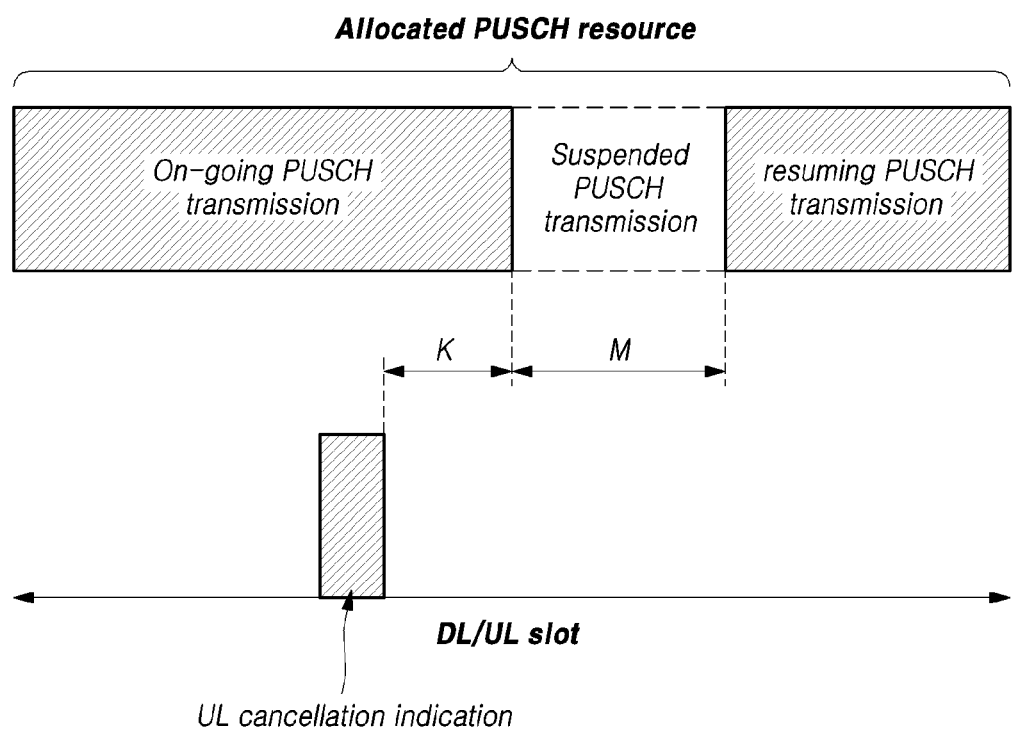
FIG. 13 illustrates further still another example of UL cancellation in accordance with Embodiment 1.

Embodiment 1-2-2 A Method of Suspending PUSCH Transmission Only in a Part of a Time Duration of the Remaining PUSCH Transmission As illustrated in FIG. 13, a UE that receives the UL cancellation indication information may suspend a PUSCH transmission corresponding to only OFDM symbols corresponding to a part of a time duration for the on-going PUSCH transmission.

Specifically, as illustrated in FIG. 13, a UE that receives an UL cancellation indication may suspend a PUSCH transmission corresponding to a time duration, M, of the PUSCH transmission after a pre-configured timing gap, K, from a time at which corresponding UL cancellation indication information transmission is performed, and thereafter, resume the PUSCH transmission. Here, the time of transmitting the UL cancellation indication information transmission may mean i) a last symbol over which the UL cancellation indication information is transmitted or ii) an UL symbol corresponding to the last symbol over which the UL cancellation indication information is transmitted.

At this time, as described above, the K value may be defined to be set by a base station/network and transmitted to a UE through explicit signaling. For example, the K value may be set by the base station/network and transmitted to the UE through UE-specific higher layer signaling or cell-specific/UE-group common higher layer signaling. As another example, the K value may be, for example, dynamically set through L1 control signaling by being included in corresponding UL cancellation indication information and then transmitted to the UE, by the base station/network.

As further another example of defining the K value, the K value may be defined to be implicitly set by capabilities of the UE. Alternatively, the base station/network may be defined to set it and transmit it to the UE through explicit signaling.

As yet another example of defining the K value, the K value may be implicitly determined. For example, the K value may be defined to be determined as a function of a numerology or an SCS value of DL or UL, or determined as a function of a monitoring period value of a cancellation indication.

Further, in a similar way to methods of determining the K value described above, methods of determining the M value, which is a suspending duration, may be defined to be set by a base station/network and transmitted to a UE through explicit signaling. For example, the M value may be set by the base station/network and transmitted to the UE through UE-specific higher layer signaling or cell-specific/UE-group common higher layer signaling. As another example, the M value may be dynamically set through L1 control signaling by being included in corresponding UL cancellation indication information and then transmitted to the UE, by the base station/network.

As further another example, the M value may be defined to be implicitly set by capabilities of the UE. Alternatively, the base station/network may be defined to set it and transmit it to the UE through explicit signaling.

As yet another example of defining the M value, the M value may be implicitly determined. For example, the M value may be defined to be determined as a function of a numerology, or an SCS value of DL or UL, or determined as a function of a monitoring period value of the cancellation indication.

Additionally, when PUSCH transmission is resumed after a pre-determined duration elapses, the base station/network may be defined to perform explicit signaling for the PUSCH transmission.

Additionally, an OFDM symbol or a symbol may be applicable as a unit for defining the K value or the M value. As a numerology or an SCS value for defining a symbol or a slot boundary, an SCS applied for a PUSCH transmission may be defined to be used, or an SCS of DL (for example, a PDCCH for UL cancellation indication transmission) may be defined to be used.

In one embodiment, UL cancellation indication information may be transmitted through a DL while a UE performs PUSCH transmission. As another embodiment, UL cancellation indication information may be transmitted through a cell adjacent to a serving cell of a UE for performing a PUSCH transmission. To do this, a multicarrier or carrier aggregation scheme may be used. It should be noted that this is merely one example; therefore, embodiments of the present disclosure are not limited to a specific method as long as a UE can receive UL cancellation indication information while performing a PUSCH transmission.

According to the embodiments, while the UE transmits an UL data channel, when an UL cancellation indication request for another UE requiring low latency is given, it is possible to fulfill latency requirements because the transmission of an UL channel for another UE can be performed with high priority. According to the embodiments, since the transmission of an UL channel of a URLLC UE can be performed while an eMBB UE performs a UL data channel transmission, it is possible to perform efficiently multiplexing for the URLLC service and the eMBB service.

Embodiment 2

In accordance with embodiments of the present disclosure, methods and apparatuses are provided for controlling UL data channel transmission power for efficient multiplexing for the URLLC service and the eMBB service, in the NR.

In accordance with embodiments of the present disclosure, as a method of efficiently supporting a UL data transmission between UEs with different latency requirements in the NR, a method and apparatus are provided for multiplexing between UL transmissions through transmission power adjusting.

As described in the Embodiment 1, as usage scenarios provided by the NR and LTE/LTE-A systems, there is increasing importance for an efficient support method for data related to the URLLC service requiring low latency and/or high reliability, along with support for data related to the eMBB service to maximize a data transmission rate, In particular, in order to satisfy the latency requirements, in the case of UL data transmission for the URLLC, the UL data transmission may be performed by preempting a part of an UL data transmission resource which has been scheduled to allocate to another UE, in a similar way to the DL case described above. For example, during an on-going UL data transmission by an eMBB UE, when an UL data transmission of an URLLC UE that is sensitive to the latency requirements is required, the URLLC UE may transmit the corresponding UL data by preempting a part of an UL data transmission resource of the eMBB UE.

The Embodiment 1 may define a method of the UE for suspending an UL data channel (PUSCH) transmission of a UE that is currently transmitting UL data and supporting an UL cancellation indication for allowing the corresponding resource is to be used for an UL data transmission of the URLLC UE.

In this case, PUSCH multiplexing based on the preemption may be performed through suitable power control between eMBB PUSCH transmission and URLLC PUSCH transmission, between which a corresponding collision occurs. In particular, it is possible for ensure urgent URLLC PUSCH reception in a base station by i) instructing to allocate sufficient PUSCH transmission power to a UE that performs URLLC PUSCH transmission for a part time duration or frequency duration resource allocated for the URLLC PUSCH transmission within an eMBB PUSCH transmission period and ii) instructing to lower PUSCH transmission power to a UE that performs the eMBB PUSCH transmission.

The Embodiment 2 introduces methods and apparatuses for indicating dynamic power adjustment in order to ensure PUSCH transmission performance of one UE (e.g., a URLLC UE) that uses a part of the same radio resource together with the other UE (e.g., an eMBB UE) through adjusting the PUSCH transmission power of the other UE that is currently transmitting.

Herein, indication control information for dynamically changing the PUSCH transmission power of a UE performing a PUSCH transmission is referred to as an UL discontinuous TPC command or an UL discontinuous TPC command information. This is merely for convenience of description; thus, embodiments of the present disclosure are not limited to a specific term. The term "UL discontinuous TPC command" may be referred to as an UL cancellation indication, an UL preemption indication, an UL suspending TPC command, an UL interrupt TPC command, or the like.

The Embodiment 2 introduces a method, a UE, and a base station for controlling transmission power. The method may include: transmitting/receiving an UL data channel according to first transmission power control between the UE and the base station, transmitting/receiving an UL discontinuous TPC command, and adjusting the transmission power of an UL data channel being transmitted with a second transmission power control based on the UL discontinuous TPC command.

Hereinafter, monitoring information configuration and discontinuous TPC command information configuration for an UL discontinuous TPC command according to the Embodiment 2 will be discussed in detail.

Embodiment 2-1 Configuring Monitoring Information for an UL Discontinuous TPC Command As a method of transmitting UL discontinuous TPC command information, a UE-specific DCI format for a discontinuous TPC command may be defined. A base station may transmit the discontinuous TPC command information to each UE through a UE-specific PDCCH transmitted through a UE-specific CORESET or a UE-specific search space for each UE.

As another method of transmitting discontinuous TPC command information, a UE-group common DL DCI format for a discontinuous TPC command may be defined. A base station may transmit the discontinuous TPC command information to each UE through a UE-group common PDCCH transmitted through a UE-group common CORESET or a UE-group common search space, configured for a UE-group.

Thus, when a discontinuous TPC command is defined to be transmitted through a UE-specific PDCCH or a UE-group common PDCCH, a base station/network may be defined to configure monitoring for the discontinuous TPC command through UE-specific higher layer signaling or cell-specific/UE-group common higher layer signaling for any UE. In this case, the monitoring configuration for the discontinuous TPC command may be configured independently of whether monitoring is configured for a DL preemption indication.

Specifically, monitoring configuration information on the discontinuous TPC command may include CORESET and search space configuration information, RNTI configuration information, monitoring period configuration information, etc. for monitoring on corresponding discontinuous TPC command information.

Embodiment 2-2 Configuring Discontinuous TPC Command Information and a Method of a UE Therefor

Embodiment 2-2-1 A Method of Readjusting Power for all of One or More Remaining PUSCH Transmission(s)

In case a UE receives discontinuous TPC command information for PUSCH transmission on remaining OFDM symbol(s) in a situation where one or more resource(s) are allocated for a PUSCH being transmitted, the UE may be defined to readjust transmission power according to the received corresponding discontinuous TPC command information and perform transmission of remaining PUSCH based on the readjusted transmission power.

Specifically, a UE that receives a discontinuous TPC command may be defined to transmit a remaining PUSCH by readjusting transmission power according to corresponding discontinuous TPC command indication information for the remaining PUSCH transmission after a pre-configured timing gap, K, from a time at which the corresponding discontinuous TPC command information transmission is performed. For example, the time at which the discontinuous TPC command information transmission is performed may mean a last symbol over which the discontinuous TPC command information is transmitted or an UL symbol corresponding to the last symbol over which the discontinuous TPC command information is transmitted.

That is, the UE that receives the discontinuous TPC command may determine PUSCH transmission power according to a first transmission power control operation before a pre-configured timing gap, K', from a time at which the corresponding discontinuous TPC command information transmission is performed and readjust transmission power according to a second transmission power control operation based on the corresponding discontinuous TPC command indication information for remaining PUSCH transmission after the pre-configured timing gap. For example, as described below, the first transmission power control may mean that a typical PUSCH transmission power control method is used, and the second transmission power control may mean that transmission power is readjusted with the second transmission power control based on corresponding discontinuous TPC command indication information.

As described below, the first transmission power control may mean that Equation (1) described below or a newly defined equation is used and parameters or a set of parameters defined in the Equation (1) are applied to the Equation (1) or the newly defined equation. Further, the second transmission power control may mean that the same equation as the first transmission power control is used, but parameters or a set of parameters different from those of the first transmission power control are applied.

The parameters or the set of parameters used in the first and second transmission power control operations may include one or more of $P_{CMAX, f, c}(i)$ that is maximum transmission power, a component of $P_{O\_NOMINAL\_PUSCH, f,c}(j)$ and a component of $P_{O\_UE\_PUSCH, f,c}(j)$ provided by higher layer parameters, $P_{o\_PUSCH, f, c}(j)$ that is a parameter configured by the sum of the component of $P_{O\_NOMINAL\_PUSCH, f,c}(j)$ and the component of $P_{O\_UE\_PUSCH, f,c}(j)$, $\Delta_{TF,f,c}(i)$ that is an offset value calculated by one or more specific higher layer parameter(s), $\delta_{PUSCH,c}$ according to a TPC command value transmitted through DL control information, $\delta_{PUSCH,c}$ that is a TPC command included in the DL control information, and $f_{f,c}(i, l)$ that is a value representing a PUSCH power control adjustment state with index 1 calculated by one or more specific higher layer parameter(s), which are configured for a corresponding UE in the Equation (1).

Meanwhile, an equation applied to the first transmission power control operation and an equation applied to the second transmission power control operation may be different from each other. As described below, the Equation (1) may be applied for the first transmission power control operation. A equation different from the Equation (1) may be applied for the second transmission power control operation.

At this time, the K' value may be defined to be set by a base station/network and transmitted to a UE through explicit signaling. For example, the K' value may be set by the base station/network and transmitted to the UE through UE-specific higher layer signaling or cell-specific/UE-group common higher layer signaling. The K' value may be dynamically set through physical layer control signaling by the base station/network and then, be transmitted. For example, the K' value may be included in a corresponding discontinuous TPC command dynamically transmitted through physical layer control signaling.'

As another method of defining the K' value, the K' value may be defined to be implicitly set by capabilities of the UE, or based on this, the base station/network may be defined to set it and, as described above, transmit it to the UE through explicit signaling.

In yet another method of defining the K' value, the K' value may be implicitly determined. For example, the K' value may be defined to be determined as a function of a numerology, a subcarrier spacing, or an SCS value, of UL or DL. As another example, K' value may be defined to be determined as a function of a monitoring period value of the discontinuous TPC command.

Further, corresponding discontinuous TPC command indication information may be defined to include power offset indication information for readjusting transmission power of a corresponding PUSCH. By readjusting a transmission power value of a PUSCH being transmitted according to the corresponding power offset indication information, a UE receiving the corresponding discontinuous TPC command information is able to transmit remaining PUSCH.

When a UE transmits a PUSCH using a carrier f of a serving cell c using a parameter set configuration with index j and a PUSCH power control adjustment state with index 1, transmission power ($P_{PUSCH, f, c}$ (i, j, qd, l)) for a PUSCH transmission of any UE in PUSCH transmission period i is determined by the Equation (1) below.

$$P_{PUSCH,f,c}(i, j, q_d, l) = \min \begin{Bmatrix} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{Bmatrix} \quad (1)$$

In the Equation (1), each of variables summarized below is specifically defined in "7. Uplink Power control" of TS38.213.

$P_{CMAX, f, c}(i)$ is the UE configured maximum output power for carrier f of serving cell c in PUSCH transmission period i.

$P_{o\_PUSCH, f, c}(j)$ is a parameter composed of the sum of a component $P_{O\_NOMINAL\_PUSCH, f,c}(j)$ and a component $P_{O\_UE\_PUSCH, f,c}(j)$.

u is a subcarrier spacing for a PUSCH on carrier f of serving cell c.

$M_{RB,f,c}^{PUSCH}(i)$ is the bandwidth of the PUSCH resource assignment expressed in number of resource blocks for PUSCH transmission.

$\alpha_{f,c}(j)$ is supplied by a specific higher layer parameter; $PL_{f,c}(q_d)$ is a downlink pathloss estimate in dB calculated by the UE using reference signal (RS) resource $q_d$; $\Delta_{TF,f,c}(i)$ is a offset value calculated by a specific higher layer parameter; and $f_{f,c}(i, l)$ is a value representing a TPC command included downlink control information and a PUSCH power control adjustment state with index 1 calculated by a specific higher layer parameter.

When a UE performs PUSCH transmission based on one or more slot(s) or a mini-slot (i.e. a non-slot), a PUSCH transmission power value is derived by the Equation (1).

In the NR, if a new equation is defined for PUSCH transmission power, a PUSCH transmission power value of a corresponding UE may be determined according to the new equation.

When a UE determines PUSCH transmission power based on an equation for the PUSCH transmission power as the first transmission power control operation and receives a discontinuous TPC command, the UE may perform transmission for remaining PUSCH according to power offset indication information indicated through the discontinuous TPC command by readjusting transmission power based on an indicated power offset value relative to transmission power by the Equation (1), as the second transmission power control operation.

Here, the power offset indication information indicated by the corresponding discontinuous TPC command may be formed of 1 bit or more.

In this case, as a method of defining the power offset value to be applied according to a specific set value of the power offset indication information of the corresponding discontinuous TPC command, a fixed power offset value may be defined in the form of table according to a configured value of the corresponding discontinuous TPC command.

As another example, a power offset value according to a set value of the corresponding discontinuous TPC command may be set by a base station. When a base station sets a power offset value according to a set value of the corresponding discontinuous TPC command, a corresponding power offset value for each set value of power offset indication information of the corresponding discontinuous TPC command may be set for each UE and transmitted through UE-specific high layer signaling or may be set for all UEs in a corresponding cell or for each UE-group and transmitted cell-specific/UE-group common high layer signaling.

In the Embodiment 2, the PUSCH transmission power control according to the discontinuous TPC command may include allowing remaining PUSCH transmission power to be 0, in addition to readjusting power for a remaining PUSCH according to the discontinuous TPC command.

For example, in addition to an indication for power readjustment for a remaining PUSCH through the power offset indication information through the discontinuous TPC command, an information region for indicating the suspending of the corresponding remaining PUSCH transmission itself, that is, an information region for indicating corresponding remaining PUSCH transmission power to be 0 may be included.

Specifically, flag information of 1 bit for indicating whether the corresponding discontinuous TPC command is for transmission power readjustment for a remaining PUSCH or is for suspending transmission for the remaining PUSCH may be included. Through the flag information of the 1 bit, a corresponding UE can determine to transmit a remaining PUSCH by readjusting transmission power for the remaining PUSCH or to suspend the remaining PUSCH transmission, according to the corresponding discontinuous TPC command.

As another example, when power offset indication information in the discontinuous TPC command is set as a specific value (e.g., set as '0'), a UE receiving the corresponding discontinuous TPC command may be defined to suspend remaining PUSCH transmission itself.

Embodiment 2-2-2 Readjusting and Transmitting Transmission Power Only for PUSCH Transmission in a Part of Remaining PUSCH Transmission Period A UE that received a discontinuous TPC command may be defined to readjust PUSCH transmission power only during a predetermined part time duration while transmitting a PUSCH.

Figure 15:
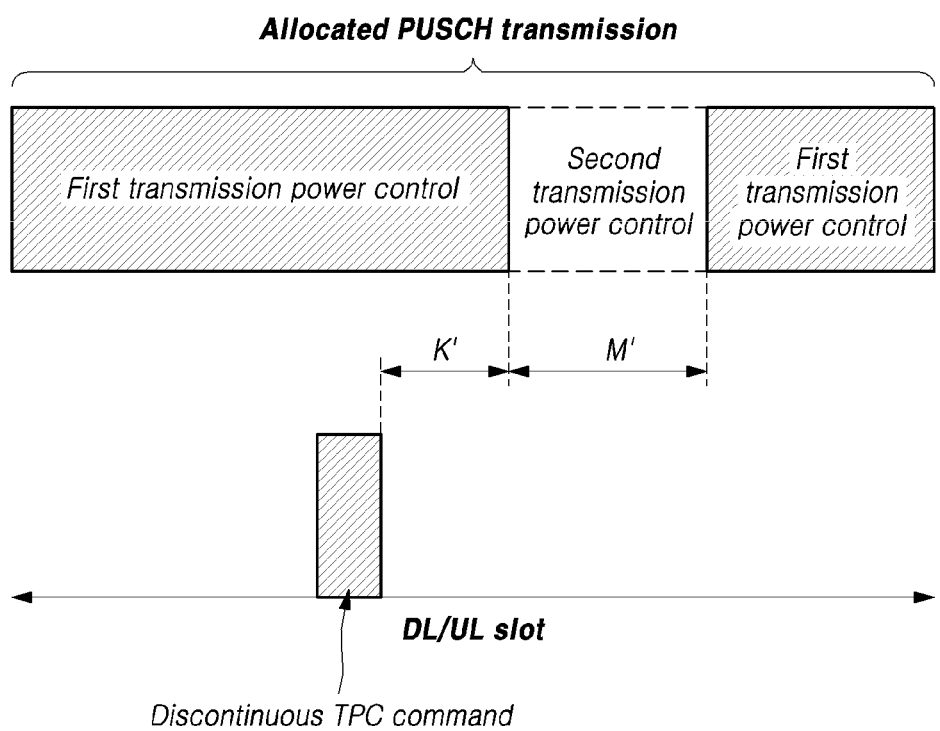
FIGS. 15 and 16 illustrate another example of PUSCH transmission power readjustment according to a discontinuous TPC command in accordance with Embodiment 2.

Specifically, as shown in FIG. 15, a UE that received a discontinuous TPC command may readjust a transmission power value for PUSCH transmission corresponding to an adjusting time duration, M', among PUSCH transmission after a pre-configured timing gap, K', from a time at which the corresponding discontinuous TPC command information transmission is performed, and thereafter, the UE may re-perform the PUSCH transmission based on an original transmission power value.

That is, as shown in FIG. 15, the UE that received the discontinuous TPC command may determine PUSCH transmission power as the first transmission power control operation before a pre-configured timing gap, K', from a time at which corresponding discontinuous TPC command information transmission is performed, and the UE may readjust transmission power as the second transmission power control operation based on the corresponding discontinuous TPC command indication information for a remaining PUSCH transmission during a readjusting time duration, M', after the timing gap, K'. The UE may determine PUSCH transmission power according to the first transmission power control operation after the timing gap, K', and the readjusting time duration, M', from the time at which the corresponding discontinuous TPC command information transmission is performed.

The first transmission power control operation and the second transmission power control operation may be similar to those discussed in Embodiment 2-2-1.

As shown in FIG. 15, a UE receiving a discontinuous TPC command may determine PUSCH transmission power as a third transmission power control operation different from the first and second transmission power control operations after the timing gap, K', and the readjusting time duration, M', from a time at which the corresponding discontinuous TPC command information transmission is performed. A parameter or a set of parameters different from the first and second transmission power control operations, or a different equation may be applied for the third transmission power control operation.

As discussed in the Embodiment 2-2-1, the time at which the discontinuous TPC command information transmission is performed may mean, for example, a last symbol over which the discontinuous TPC command information is transmitted or an UL symbol corresponding to the last symbol over which the discontinuous TPC command information is transmitted.

At this time, a method of determining the K' value, a method of determining a power offset value for transmission power readjustment through the corresponding discontinuous TPC command, a method of indicating whether to suspend corresponding PUSCH transmission or adjust transmission power, and the like may be similar to those discussed in Embodiment 2-2-1.

Further, in a similar manner to the method of determining the K' value, a method of determining the M' value (which is a time duration of applying the transmission power readjustment) may be defined to be set by a base station/network, and transmitted to a UE through explicit signaling. For example, the M value may be set by the base station/network and transmitted to the UE through UE-specific higher layer signaling or cell-specific/UE-group common higher layer signaling. The M' value may be dynamically set through physical layer control signaling and transmitted. For example, the M' value may be included in corresponding discontinuous TPC command information dynamically transmitted through physical layer control signaling.'

As another example, the M' value may be defined to be implicitly set by capabilities of the UE. Alternatively, the base station/network may be defined to set the M' value and transmit the M' value to the UE through explicit signaling.

As further another method of defining the M' value, the M' value may be implicitly determined. For example, the M value may be defined to be determined as a function of a numerology, or an SCS value of DL or UL, or determined as a function of a monitoring period value of the cancellation indication.

Additionally, transmission power readjustment based on discontinuous TPC command information according to the Embodiment 2-2-1 and the Embodiment 2-2-1 may be temporarily applied for only either a PUSCH being transmitted at a time at which the corresponding discontinuous TPC command is received or a PUSCH transmission to which the application of the corresponding discontinuous TPC command is indicated, and the corresponding power readjustment value may not be accumulatively applied for other subsequent PUSCH transmission. That is, in the case of a subsequent PUSCH, a typical PUSCH transmission power control procedure may be applied regardless of whether a corresponding discontinuous TPC command is received and a power readjustment value according to the discontinuous TPC command.

Figure 17:
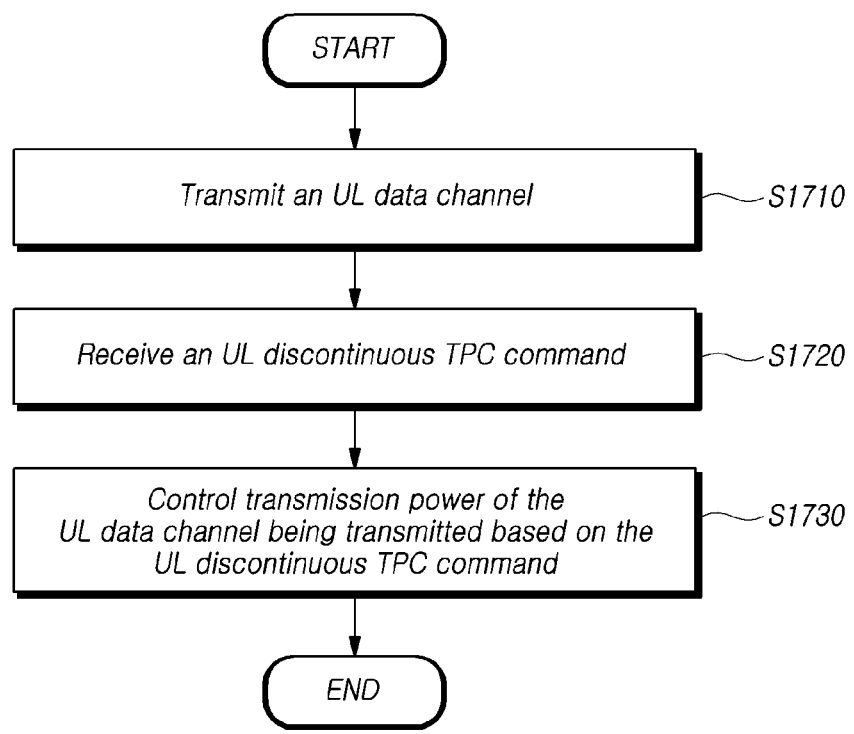
FIG. 17 shows a flow diagram illustrating a method of a UE for controlling transmission power of an UL data channel in accordance with the Embodiment 2.

FIG. 17 shows a flow diagram illustrating a method of a UE for controlling transmission power of an UL data channel in accordance with the Embodiment 2.

Referring to FIG. 17, a method of a UE in accordance with the Embodiment 2 for controlling transmission power of an UL data channel may include transmitting an UL data channel according to the first transmission power control operation at step S1710, receiving an UL discontinuous TPC command at step S1720, and adjusting the transmission power of the UL data channel being transmitted with the second transmission power control based on the UL discontinuous TPC command at step S1730.

In step S1720 of receiving the UL discontinuous TPC command, the UE may monitor the UL discontinuous TPC command based on monitoring configuration information for the UL discontinuous TPC command.

As discussed in the Embodiment 2, the monitoring configuration information may include control resource set (CORESET) and search space configuration information for monitoring the UL discontinuous TPC command, radio network temporary identifier (RNTI) configuration information, monitoring period configuration information, and the like. Details thereof are the same as those specifically discussed in the Embodiment 2-1.

The UL discontinuous TPC command may be indicated through UE-specific DCI or UE-group common DCI.

Figure 14:
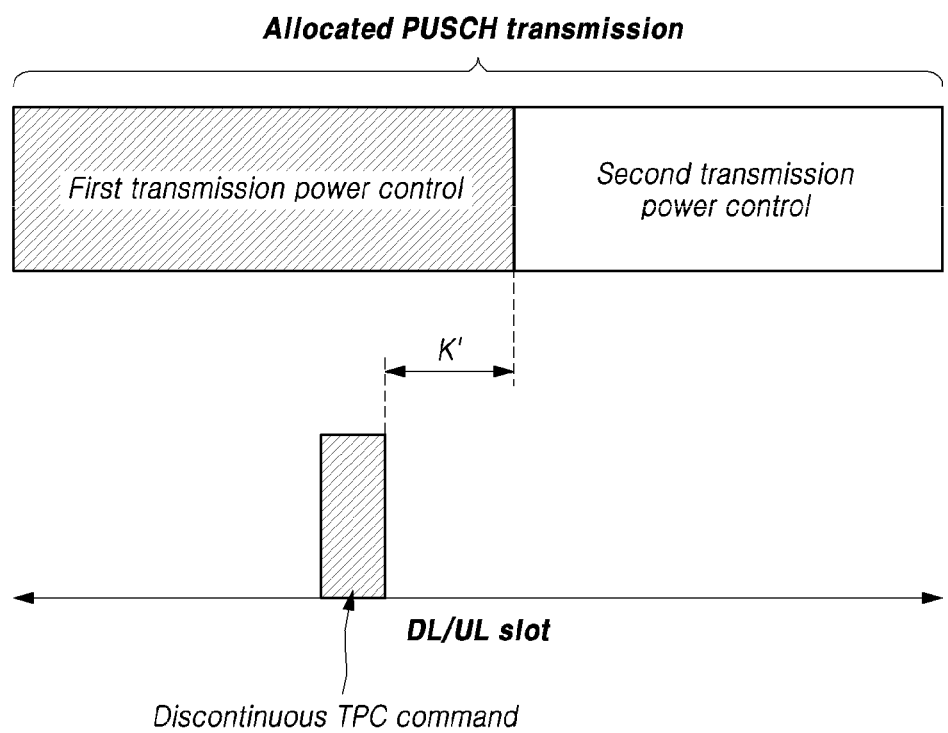
FIG. 14 illustrates an example of PUSCH transmission power readjustment according to a discontinuous TPC command in accordance with Embodiment 2.

The step S1730 of adjusting the transmission power of the UL data channel according to the second transmission power control operation may be performed such that the transmission power of the UL data channel is adjusted according to the second transmission power control operation after a predetermined latency period elapses from a time at which the UL discontinuous TPC command is received. Details thereof are the same as those specifically discussed in the Embodiment 2-2-1 described above with reference to FIG. 14.

The step S1730 of adjusting the transmission power may be performed such that the UL data transmission is suspended in a slot on which the UL discontinuous TPC command is received, or the transmission power of the UL data channel is adjusted with the second transmission power control for the entire of a plurality of slots allocated based on the UL data channel resource allocation information for the UL data channel.

Figure 16:
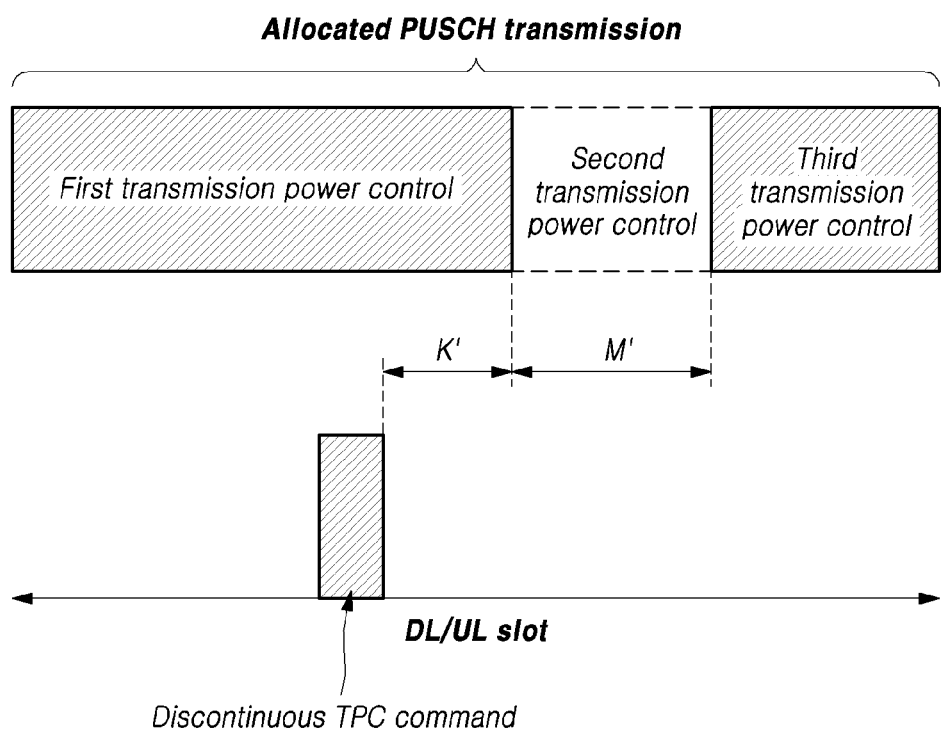

The UL discontinuous TPC command may further include information on a readjustment period at which the transmission power of the UL data channel is adjusted according to the second transmission power control operation. The step S1730 of adjusting the transmission power of the UL data channel with the second transmission power control may be performed such that the transmission power of the UL data channel may be adjusted with the second transmission power control during a readjustment period, and after the readjustment period elapses, the transmission power of the UL data channel may be adjusted with the first transmission power control. Details of this are the same as those specifically discussed in the Embodiment 2-2-2 described above with reference to FIGS. 15 and 16.

Figure 18:
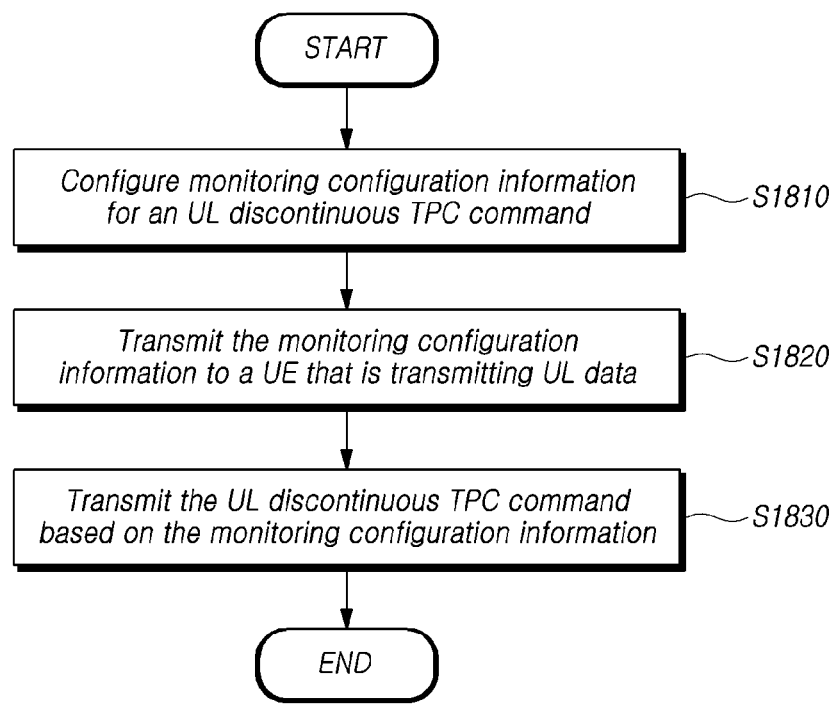
FIG. 18 shows a flow diagram illustrating a method of a base station for controlling an UL data channel of a UE in accordance with the Embodiment 2.

FIG. 18 shows a flow diagram illustrating a method of a base station for controlling an UL data channel of a UE in accordance with the Embodiment 2.

Referring to FIG. 18, the method of the base station for controlling the UL data channel of the UE may include configuring monitoring configuration information for an UL discontinuous TPC command at step S1810, transmitting the monitoring configuration information to the UE that is transmitting the UL data channel at step S1820, and transmitting the discontinuous TPC command based on the monitoring configuration information at step S1830.

The monitoring configuration information may include control resource set (CORESET) and search space configuration information for monitoring the UL discontinuous TPC command, radio network temporary identifier (RNTI) configuration information, monitoring period configuration information, and the like. Details thereof are the same as those specifically discussed in the Embodiment 2-1.

The UL discontinuous TPC command may be indicated through UE-specific DCI or UE-group common DCI.

As specifically discussed in the Embodiment 2-2-1 described above with reference to FIG. 14, the UE may readjust the transmission power of the UL data channel after a predetermined latency period elapses from a time at which the UL discontinuous TPC command is received.

The UE may readjust the transmission power of the UL data channel in a slot on which the UL discontinuous TPC command is received, or the UE may readjust the transmission power of the UL data channel for the entire of a plurality of slots allocated based on the UL data channel resource allocation information for the UL data channel.

As specifically discussed in the Embodiment 2-2-2 described above with reference to FIG. 15 and FIG. 16, information on a readjustment period at which the transmission power of the UL data channel is adjusted as the second transmission power control may be further included. The UE may adjust the transmission power of the UL data channel as the second transmission power control during the readjustment period, and after the readjustment period elapses, adjust the transmission power of the UL data channel with the first transmission power control.

Figure 19:
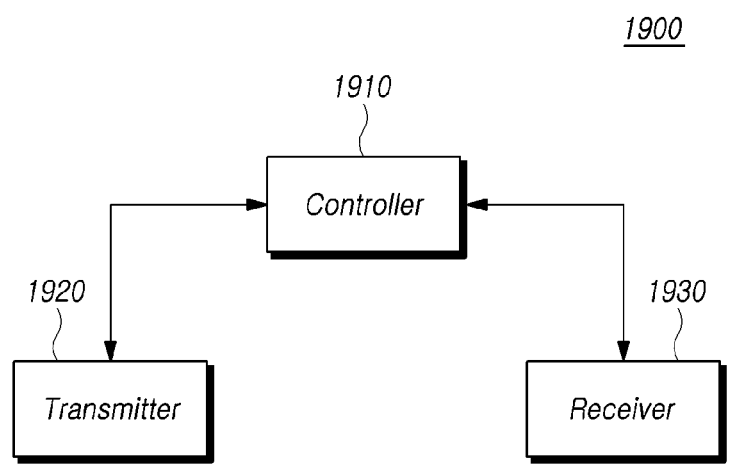
FIG. 19 is a block diagram illustrating a base station according to the Embodiment 2.

FIG. 19 is a block diagram illustrating a base station according to Embodiment 2.

Referring to FIG. 19, a base station 1900 includes a controller 1910, a transmitter 1920, and a receiver 1930.

The controller 1910 controls overall operations of the base station 1900 needed to perform methods of controlling transmission power of an UL data channel in the NR needed for performing the embodiments of the present disclosure described above.

The transmitter 1920 is configured to transmit signals, messages, and data needed for carrying out the embodiments described above to a UE. The receiver 1930 is configured to receive signals, messages, and data needed for carrying out the embodiments described above from a UE.

The base station controlling UL data transmission of a UE may include the controller 1900 and the transmitter 1920. The controller 1900 controls monitoring configuration information for an UL discontinuous TPC command. The transmitter 1920 transmits the monitoring configuration information to the UE that is transmitting the UL data channel and transmits the UL discontinuous TPC command based on the monitoring configuration information.

The monitoring configuration information may include control resource set (CORESET) and search space configuration information for monitoring the UL discontinuous TPC command, radio network temporary identifier (RNTI) configuration information, monitoring period configuration information, and the like. Details thereof are the same as those specifically discussed in the Embodiment 2-1.

The UL discontinuous TPC command may be indicated through UE-specific DCI or UE-group common DCI.

The UE may readjust the transmission power of the UL data channel after a predetermined latency period elapses from a time at which the UL discontinuous TPC command is received. Details thereof are the same as those specifically discussed in the Embodiment 2-2-1 described above with reference to FIG. 14.

The UE may readjust the transmission power of the UL data channel in a slot on which the UL discontinuous TPC command is received, or the UE may readjust the transmission power of the UL data channel for the entire of a plurality of slots allocated based on the UL data channel resource allocation information for the UL data channel.

The UL discontinuous TPC command may further include information on a readjustment period at which the transmission power of the UL data channel is adjusted with the second transmission power control.

The UE may adjust the transmission power of the UL data channel with the second transmission power control during the readjustment period, and after the readjustment period elapses, adjust the transmission power of the UL data channel with the first transmission power control. Details thereof are the same as those specifically discussed in the Embodiment 2-2-2 described above with reference to FIGS. 15 and 16.

Figure 20:
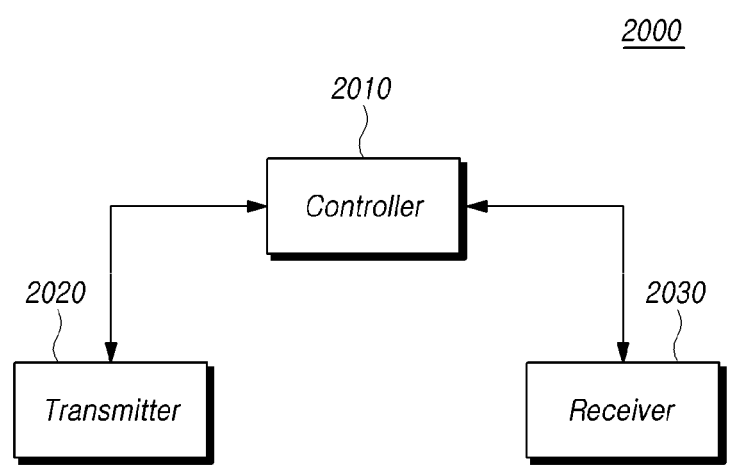
FIG. 20 is a block diagram illustrating a UE according to the Embodiment 2.

FIG. 20 is a block diagram illustrating a UE according to the Embodiment 2.

Referring to FIG. 20, the UE 2000 includes a receiver 2010, a controller 2020, and a transmitter 2030.

The receiver 2010 receives DL control information, data, and messages through a corresponding channel from the base station.

The controller 2020 controls overall operations of the UE 2000 needed to perform methods of controlling transmission power of an UL data channel in the NR needed for performing the embodiments of the present disclosure described above.

The transmitter 2030 transmits UL control information, data, and messages through a corresponding channel to a base station.

The UE 2000 transmitting UL data may include the transmitter 2030, the receiver 2010, and the controller 2020. The transmitter may transmit an UL data channel according to the first transmission power control, the receiver 2010 may receive an UL discontinuous TPC command, and the controller 2020 may adjust transmission power of the UL data channel being transmitted as the second transmission power control based on the UL discontinuous TPC command.

The receiver 2010 may monitor the UL discontinuous TPC command based on monitoring configuration information for the UL discontinuous TPC command.

As discussed in the Embodiment 2, the monitoring configuration information may include control resource set (CORESET) and search space configuration information for monitoring the UL discontinuous TPC command, radio network temporary identifier (RNTI) configuration information, monitoring period configuration information, and the like. Details thereof are the same as those specifically discussed in the Embodiment 2-1.

The UL discontinuous TPC command may be indicated through UE-specific DCI or UE-group common DCI.

The controller 2020 may adjust the transmission power of the UL data channel as the second transmission power control after a predetermined latency period elapses from a time at which the UL discontinuous TPC command is received. Details thereof are the same as those specifically discussed in the Embodiment 2-2-1 described above with reference to FIG. 14.

The controller 2020 may suspend the transmission of the UL data in a slot on which the UL discontinuous TPC command is received, or adjust the transmission power of the UL data channel as the second transmission power control for the entire of a plurality of slots allocated based on UL data channel resource allocation information for the UL data channel.

The UL discontinuous TPC command may further include information on a readjustment period at which the transmission power of the UL data channel is adjusted with the second transmission power control. The controller 2020 may adjust the transmission power of the UL data channel with the second transmission power control during the readjustment period, and after the readjustment period elapses, adjust the transmission power of the UL data channel as the first transmission power control. Details thereof are the same as those specifically discussed in the Embodiment 2-2-2 described above with reference to FIGS. 15 and 16.

Embodiment 3

In accordance with embodiments of the present disclosure, methods and apparatuses are provided for controlling UL power for supporting the URLLC service and the eMBB service, in the NR.

Herein, UL power control methods are provided for satisfying different service requirements in wireless mobile communication systems, such as the LTE/LTE-A, the NR or the like. In particular, provided herein are methods and apparatuses for supporting a plurality of UL power control procedures in one UE according to service requirements.

As usage scenarios provided by NR and LTE/LTE-A systems, there is increasing importance for a method for efficiently supporting data related to the URLLC service requiring low latency and/or high reliability, along with support for data related to the eMBB service to maximize data transmission rate.

In particular, in the case of data related to the URLLC service, it is necessary to improve the reliability of data transmission and reception compared to the eMBB service, along with technology to minimize a latency period. To do this, it is necessary to improve the reliability of a PDSCH/PUSCH for UL/DL data transmission/reception.

In accordance with embodiments of the present disclosure, in order to satisfy such different reliability requirements, methods and apparatuses are provided for defining and applying different power control procedures according to corresponding reliability requirements when one UE transmits UL data.

According to a power control method for transmitting a PUSCH, which is an UL data channel of a UE defined in the LTE/LTE-A and NR systems, corresponding PUSCH transmission power is determined by applying one or more higher layer power control parameter(s) or one or more dynamic power control parameter(s) according to a TPC command using a single transmission power control equation.

As described below, transmission power for a PUSCH is determined by a value of $P_{O\_UE\_PUSCH,f,c}(i)$ that is determined by p0-pusch-alpha-set that is a higher layer parameter, a TPC command value transmitted over a PDCCH, and the like according to the single transmission power control equation.

Herein, when a UE transmits a PUSCH, provided are methods and apparatuses for applying different power control procedures according to reliability requirements for the PUSCH transmission.

Figure 21:
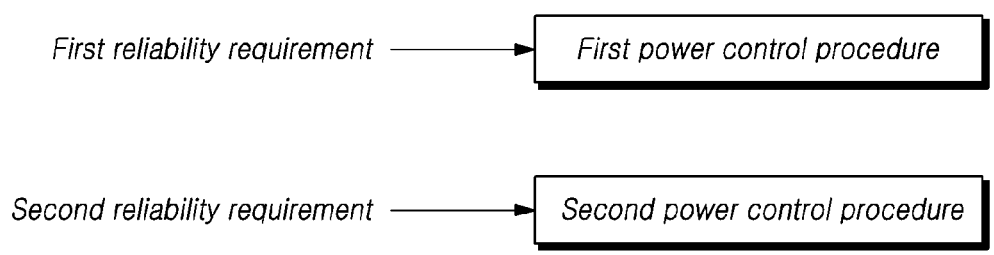
FIG. 21 illustrates a conception of multiple transmission power control procedures based on a reliability requirement in accordance with Embodiment 3.

FIG. 21 is a diagram for describing multiple transmission power control procedures based on a reliability requirement in accordance with Embodiment 3.

Referring to FIG. 21, in accordance with the Embodiment 3, provided are a method, a UE, and a base station for applying power control differently according to each reliability requirement of an UL data channel between the UE and a base station and transmitting/receiving the UL data channel.

Hereinafter, the multiple power control procedures of a UE and a base station according to the Embodiment 3 will be described in detail.

Embodiment 3-1 Multiple Transmission Power Control Procedures Based on Reliability Requirements Embodiment 3-1-1 Applying a Set of Multiple Transmission Power Control Parameters Based on Reliability Requirements A plurality of sets of power control parameters are defined to control transmission power for one or more PUSCHs for one UE. For any PUSCH transmission, the plurality of sets of power control parameters are defined to apply values of a set of parameters different from another according to reliability requirement or a target block error rate (BLER) for the corresponding PUSCH to a corresponding transmission power control equation. The reliability requirement or the target BLER is referred to as "target BLER".

As already discussed in the Embodiment 2-2-1, when a UE transmits a PUSCH using a carrier f of a serving cell c using a parameter set configuration with index j and a PUSCH power control adjustment state with index 1, transmission power ($P_{PUSCH, f, c}$ (i, j, qd, l)) for a PUSCH transmission of any UE in PUSCH transmission period i is determined by the Equation (1) above.

Further, a set of higher layer parameters and a set of TPC command values indicated by a PDCCH are defined to be applied to respective parameters of the Equation (1). However, the corresponding power control parameters are defined as a single value or a single set of values based on a single target BLER for a PUSCH transmission, and using the single value or the single set of values, the single transmission power equation is used for the PUSCH transmission.

The Embodiment 3 relates to a method of UL power control for satisfying a plurality of target BLERs for PUSCH transmission. In accordance with the Embodiment 3, provided is a method of defining different pluralities of power control parameters or different sets of power control parameters for respective BLERs for different PUSCHs in one UE, and independently applying each of the different pluralities of power control parameters or each of the different sets of power control parameters for each PUSCH transmission.

The different pluralities of power control parameters or the different sets of power control parameters for the respective BLERs for the different PUSCHs in one UE may include one or more of $P_{CMAX,f,c}(i)$ that is maximum transmission power, a component of $P_{O\_NOMINAL\_PUSCH, f, c}(j)$ and a component of $P_{O\_UE\_PUSCH, f, c}(j)$ provided by higher layer parameters, $P_{o\_PUSCH, f, c}(j)$ that is a parameter configured by the sum of the component of $P_{O\_NOMINAL\_PUSCH, f, c}(j)$ and the component of $P_{O\_UE\_PUSCH, f, c}(j)$, $\Delta_{TF,f,c}(i)$ that is an offset value calculated by one or more specific higher layer parameter(s), $\delta_{PUSCH,c}$ according to a TPC command value transmitted through DL control information, $\delta_{PUSCH,c}$ that is a TPC command included in the DL control information, and $f_{f,c}(i, l)$ that is a value representing a PUSCH power control adjustment state with index 1 calculated by one or more specific higher layer parameter(s), which are configured for a corresponding UE in the Equation (1).

For example, when $10^{-1}$ and $10^{-5}$ are defined as target BLERs for a PUSCH transmission required in the NR, a $P_{CMAX, a}$ value for a PUSCH transmission requiring the target BLER of $10^{-1}$ and a $P_{CMAX, b}$ value for a PUSCH transmission requiring the target BLER of $10^{-5}$ may be defined to be applied to the Equation (1) described above for one UE. The $P_{CMAX, a}$ value and the $P_{CMAX, b}$ value are values corresponding to $P_{CMAX, f, c}(i)$ of the Equation (1).

Likewise, in even defining p0-pusch-alpha-set that is a set of higher layer parameters for deriving the $P_{O\_UE\_PUSCH,f,c}(j)$ of the Equation (1), p0-pusch-alpha-set-a for a PUSCH transmission requiring the target BLER of $10^{-1}$ and p0-pusch-alpha-set-b for a PUSCH transmission requiring the target BLER of $10^{-5}$ may be defined.

Likewise, in even defining a table including a $\delta_{PUSCH,c}$ value according to a TPC command value transmitted by a PDCCH, TPC_command_table_a for a PUSCH transmission requiring the target BLER of $10^{-1}$, TPC_command_table_b for a PUSCH transmission requiring the target BLER of $10^{-5}$, and in addition, TPC-PUSCH-RNTI-a and TPC-PUSCH-RNTI-b may be defined.

Based on these, in calculating a transmission power value for a PUSCH transmission in a UE, in applying a value for each parameter included in the Equation (1) while the Equation (1) is equally used, it is possible to define to determine a set of parameters different from another according to a target BLER of a corresponding PUSCH, that is, whether to apply the a set based on the target BLER of $10^{-1}$ or whether to apply the b set based on the target BLER of $10^{-5}$.

According to this, while each UE calculates any PUSCH transmission power according to a single transmission power control equation such as the Equation (1), the UE may be defined to derive transmission power of the PUSCH by applying a set of parameter different from another according to a target BLER of the corresponding PUSCH transmission. That is, an independent transmission power control procedure may be defined and applied for each target BLER in one UE.

In addition, this embodiment may be applied regardless of the form of a specific PUSCH transmission power control equation. Further, this embodiment may be applied in a case where, by applying one of independent sets of parameters for respective target BLERs for only one or more of the parameters to be applied to a single PUSCH transmission power control equation, a separate power control procedure may be applied for each target BLER for the one or more parameters based on the applied set of parameters.

Further, regardless of a specific target BLER value defined for PUSCH transmission, this embodiment may be applied in all cases where, by defining separate sets of power control parameters for respective target BLERs, as described above, each of the defined separate sets of parameters is independently applied according to a target BLER required from each PUSCH transmission.

Additionally, a base station may configure one or more parameter set(s) according to a target BLER which are to be applied to a power control equation for a PUSCH transmission in a UE, and then transmit the configured parameter set(s) to a UE through high layer signaling or explicitly indicate through physical layer control signaling. Further, one or more parameter set(s) according to a target BLER which are to be applied to a power control equation for a PUSCH transmission in a UE may be implicitly indicated as a function of a PUSCH resource allocation type (type A or type B), time-domain symbol allocation information, or the like.

The physical layer control signaling may mean, for example, DCI such as an UL grant transmitted through a PDCCH or a TPC command. The time-domain symbol allocation information may include, for example, the number of allocated symbols or information on slot-based allocation versus non-slot-based allocation.

In another example, a power control parameter set corresponding to a target BLER may be defined to be applied by allowing a base station to set a target BLER value required for a PUSCH transmission of a corresponding UE and transmit it through high layer signaling, or explicitly, or implicitly as described above, indicate it through physical layer control signaling.

The physical layer control signaling may be an UL grant transmitted through a PDCCH, or mean DCI such as a TPC command. As a method of implicitly indicating through physical layer control signaling, a power control parameter set to be applied may be determined according to an RNTI value used for the scrambling of Cyclic Redundancy Check (CRC) of the physical layer control signaling. For example, when MCS-C-RNTI is configured for any UE in addition to Cell Radio Network Temporary Identity (C-RNTI), or a new-RNTI is defined and configured for indicating another power control parameter set, a power control parameter set for power control of a corresponding PUSCH transmission may be determined according to an RNTI value used for the scrambling of CRC of an UL grant for the UE.

Embodiment 3-2 Applying Multiple Transmission Power Control Equations Based on Reliability Requirements As another method for defining power control procedures differently according to respective target BLERs in one UE, different power control equations for respective target BLERs may be defined and applied.

For example, the power control procedure based on the Equation (1) may be used for a PUSCH transmission satisfying the target BLER of $10^{-1}$, and a new power control equation (2) may be defined and applied for a PUSCH transmission satisfying the target BLER of $10^{-5}$.

According to this, when an UE transmits a PUSCH, the UE may use the Equation (1) or the equation (2) according to each target BLER. It should be noted that this embodiment may be used regardless of the forms of specific power control equations, i.e. the Equation (1) and the equation (2).

That is, all cases that, by defining power control equations according to respective target BLERs, derive PUSCH transmission power based on one of the separately defined power control equations according to a target BLER required for any PUSCH transmission are included in the scope of this embodiment.

Further, regardless of a specific target BLER value defined for a PUSCH transmission, the scope of the embodiment includes all cases in which separate power control equations are defined for respective target BLERs different from one another, as described above.

Like this, when a separate PUSCH transmission power control equation is defined for each target BLER, as a method for indicating an equation to be used for a PUSCH transmission in an UE, a base station may configure the equation to be used for the PUSCH transmission in the UE and transmit it to the UE through high layer signaling, explicitly indicate it through physical layer control signaling, or implicitly indicate as a function of a PUSCH resource allocation type (type A or type B), time-domain symbol allocation information, or the like.

For example, the physical layer control signaling may mean DCI such as an UL grant transmitted through a PDCCH or a TPC command, and the time-domain symbol allocation information may include the number of allocated symbols or information on slot-based allocation versus non-slot-based allocation.

As another example, a power control equation corresponding to a target BLER may be defined to be applied by allowing a base station to set a target BLER value required for a PUSCH transmission of a corresponding UE and transmit it through high layer signaling, or explicitly, or implicitly as described above, indicate it through physical layer control signaling.

The physical layer control signaling may be an UL grant transmitted through a PDCCH, or the physical layer control signaling may mean DCI such as a TPC command. As a method of implicitly indicating through physical layer control signaling, a power control equation to be applied may be determined according to an RNTI value used for the scrambling of CRC of the physical layer control signaling. For example, when MCS-C-RNTI is configured for an UE in addition to C-RNTI, or a new-RNTI is defined and configured for indicating another power control parameter set, a power control equation for power control of a corresponding PUSCH transmission may be determined according to an RNTI value used for the scrambling of CRC of an UL grant for the UE.

Additionally, in an example of the Embodiment 3, as a method of defining a new equation (2) for a target BLER of $10^{-5}$ that is a new target BLER value, the equation (2) may be defined in the form of adding a component of delta that is a power boosting related parameter, compared to the Equation (1).

As the form of adding the delta that is a power boosting related parameter compared to the Equation (1), transmission power ($P_{PUSCH, f, c}$ (i, j, qd, l)) for a PUSCH transmission of any UE at PUSCH transmission period i may be the same as following Equation (2).

$$P_{PUSCH,f,c}(i, j, q_d, l) = \min\left\{\begin{array}{l}P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) + \Delta_{PB,f,c}(i)\end{array}\right\} \quad (2)$$

The other values except for the delta component of $\Delta_{PB,f,c}(i)$ in the Equation (2) may be the same as those of the Equation (1).

In this case, in defining the delta component of $\Delta_{PB,f,c}(i)$, it should be noted that a fixed single delta value of $\Delta_{PB,f,c}(i)$ may be defined, or a single delta value of $\Delta_{PB,f,c}(i)$ is set by a base station and transmitted to a UE through high layer signaling. As another method of defining the delta component of $\Delta_{PB,f,c}(i)$, a table including a plurality of fixed candidate delta values to be applied to the delta component of $\Delta_{PB,f,c}(i)$ may be defined, or a base station set a plurality of candidate delta values for configuring the table and transmit it to each UE through high layer signaling.

In this case, it should be noted that when a plurality of delta values is defined, a delta value of $\Delta_{PB,f,c}(i)$ to be applied when each PUSCH transmission is performed may be indicated to a corresponding UE through physical layer control signaling such as an UL grant, or be set through high layer signaling and transmitted to the UE.

In the Embodiment 3, a predetermined power control different from another according to each reliability requirement or for each target BLER; however, the embodiments of the present disclosure are not limited thereto. For example, the power control may be differently applied regardless of reliability requirements or target BLERs. Hereinafter, regardless of reliability requirements or target BLERs, methods, a UE, and a base station for controlling transmission power of an UL data channel by applying power control differently will be described.

Figure 22:
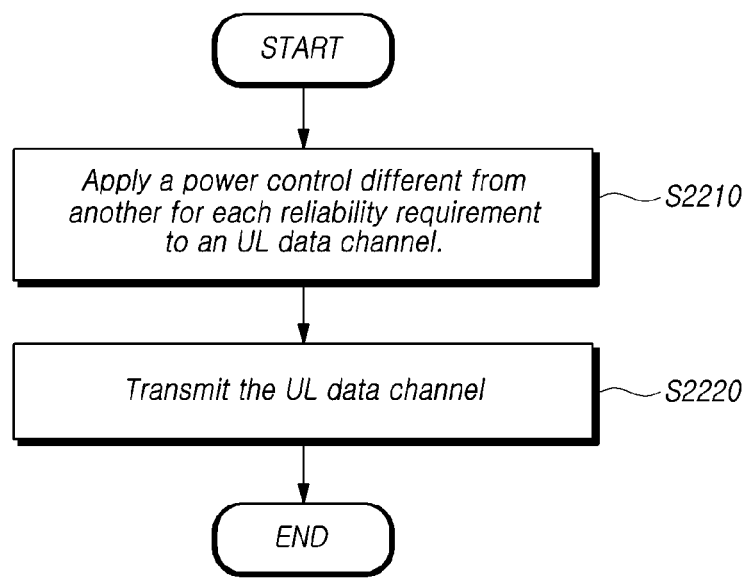
FIG. 22 is a flow diagram illustrating a method of a UE for controlling transmission power of an UL data channel in accordance with the Embodiment 3.

FIG. 22 is a flow diagram illustrating a method of a UE for controlling transmission power of an UL data channel in accordance with the Embodiment 3.

Referring to FIG. 22, a method of a UE is provided for controlling transmission power of an UL data channel. The method may include applying predetermined power control which is different from another for transmitting an UL data channel at step S2210 and transmitting the UL data channel based on the predetermined power control at step S2220.

In the step S210 of applying the predetermined power control to the UL data channel, while a single transmission power control equation is used for the UL data channel, a plurality of power control parameters or parameter sets to be applied to the transmission power control equation may be configured, and transmission power of the UL data channel may be controlled based on the single transmission power control equation to which one transmission power control parameter or parameter set is applied, among the configured plurality of power control parameters or parameter sets.

Details thereof are the same as those specifically discussed in the Embodiment 3-1-1.

The power control parameters or parameter sets may be configured for the UE through high layer signaling.

Further, each power control parameter or parameter set may be independently transmitted to the UE through high layer signaling, or explicitly or implicitly indicated through physical layer control signaling.

The implicit indicating of one power control parameter or parameter set through the physical layer control signaling may be performed by the indicating of a RNTI value used for the scrambling of CRC for a physical layer control channel transmission.

In the step S210 of applying the power control differently from another to the UL data channel, a power control for the UL data channel may be performed, by defining a plurality of transmission power control equations to be applied to the UL data channel and then applying one of the plurality of transmission power control equations.

Details thereof are the same as those specifically discussed in the Embodiment 3-1-2.

One of the transmission power control equations for the UL data channel may further include a power boosting related parameter.

The one transmission power control equation to be applied for the UL data channel transmission may be configured through high layer signaling, or explicitly or implicitly indicated through physical layer control signaling.

The implicit indicating of one power control equation through the physical layer control signaling may be performed by the indicating of a RNTI value used for the scrambling of CRC for a physical layer control channel transmission.

Figure 23:
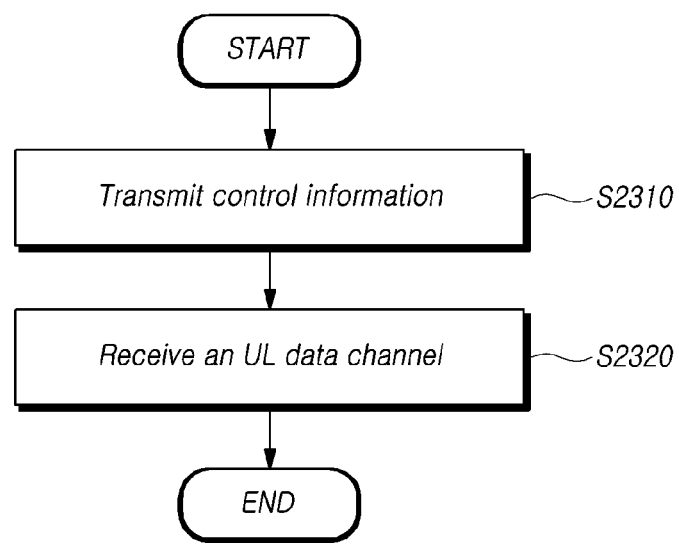
FIG. 23 shows a flow diagram illustrating a method of a base station receives an UL data channel in accordance with the Embodiment 3.

FIG. 23 shows a flow diagram illustrating a method of a base station receives an UL data channel in accordance with the Embodiment 3.

Referring to FIG. 10, a method of the base station is provided for receiving an UL data channel. The method may include explicitly transmitting, or implicitly indicating, control information for indicating a predetermined power control different from another to an UL data channel to a UE at step S2310, and receiving the UL data channel which is transmitted by applying the predetermined power control, at step S2320. In the step S2320 of receiving the UL data channel, while a single transmission power control equation is used for the UL data channel, a plurality of power control parameters or parameter sets to be applied to the transmission power control equation may be configured, and transmission power of the UL data channel may be controlled based on the single transmission power control equation to which one transmission power control parameter or parameter set is applied, among the configured plurality of power control parameters or parameter sets.

Details thereof are the same as those specifically discussed in the Embodiment 3-1-1.

The power control parameter(s) or parameter set(s) may be configured for the UE through high layer signaling.

Further, each parameter or parameter set to be applied to the one transmission power control equation may be independently transmitted to the UE through high layer signaling, or explicitly or implicitly indicated through physical layer control signaling.

The implicit indicating of one power control parameter or parameter set through the physical layer control signaling may be performed by the indicating of a RNTI value used for the scrambling of CRC for a physical layer control channel transmission.

In the step S2320 of receiving the UL data channel, a power control for the UL data channel may be performed by applying one of a plurality of transmission power control equations to be applied to the UL data channel. Details thereof are the same as those specifically discussed in the Embodiment 3-1-2.

One of the transmission power control equations for the UL data channel may further include a power boosting related parameter.

The one transmission power control equation to be applied for the UL data channel transmission may be configured through high layer signaling, or explicitly or implicitly indicated through physical layer control signaling.

The implicit indicating of one power control equation through the physical layer control signaling may be performed by the indicating of a RNTI value used for the scrambling of CRC for a physical layer control channel transmission.

Figure 24:
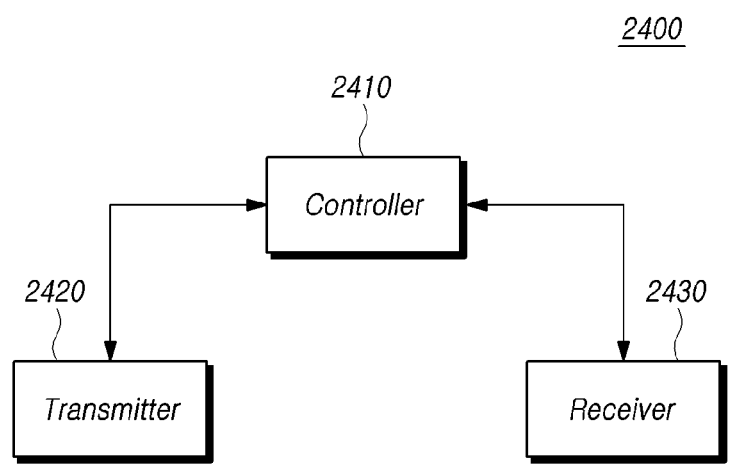
FIG. 24 is a block diagram illustrating a base station according to the Embodiment 3.

FIG. 24 is a block diagram illustrating a base station according to the Embodiment 3.

Referring to FIG. 24, the base station 2400 includes a controller 2410, a transmitter 2420, and a receiver 2430.

In methods of controlling transmission power of an UL data channel in the NR needed to perform the embodiments of the present disclosure, the controller 2410 controls overall operations of the base station 2400 needed for applying a set of power control parameters different from another for each BLER to a transmission power control function.

The transmitter 2420 is configured to transmit signals, messages, and data needed for carrying out the embodiments described above to a UE. The receiver 2430 is configured to receive signals, messages, and data needed for carrying out the embodiments described above from a UE.

The base station 2400 receiving an UL data channel may include: a transmitter 2420 explicitly transmitting, or implicitly indicating, control information for indicating a predetermined power control different from another to an UL data channel to a UE; and a receiver 2430 receiving the UL data channels which is transmitted by applying the predetermined power control different from another.

The controller 2410 may apply a single transmission power control equation for the UL data channel, configure a plurality of power control parameters or parameter sets to be applied to the transmission power control equation, and control transmission power of the UL data channel based on the single transmission power control equation to which one transmission power control parameter or parameter set is applied, among the configured plurality of power control parameters or parameter sets. Details thereof are the same as those specifically discussed in the Embodiment 3-1-1.

The power control parameter(s) or parameter set(s) may be configured for the UE through high layer signaling.

Further, each power control parameter or parameter set to be applied to the one transmission power control equation may be independently transmitted to the UE through high layer signaling, or explicitly or implicitly indicated through physical layer control signaling.

The implicit indicating of one power control parameter or parameter set through the physical layer control signaling may be performed by the indicating of a RNTI value used for the scrambling of CRC for a physical layer control channel transmission.

A power control for the UL data channel may be performed by applying one of a plurality of transmission power control equations to be applied to the UL data channel. Details of this are the same as those specifically discussed in the Embodiment 3-1-2.

One of the transmission power control equations for the UL data channel may further include a power boosting related parameter.

The one transmission power control equation to be applied for the UL data channel transmission may be configured through high layer signaling, or explicitly or implicitly indicated through physical layer control signaling.

The implicit indicating of one power control equation through the physical layer control signaling may be performed by the indicating of a RNTI value used for the scrambling of CRC for a physical layer control channel transmission.

Figure 25:
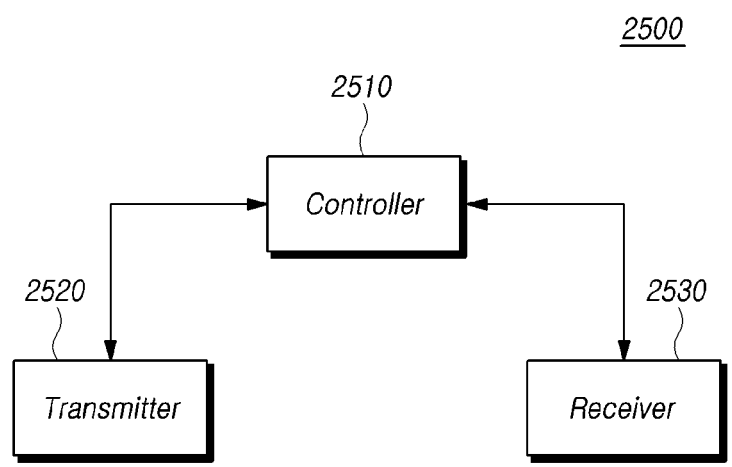
FIG. 25 is a block diagram illustrating a UE according to the Embodiment 3.

FIG. 25 is a block diagram illustrating a UE according to the Embodiment 3.

Referring to FIG. 25, the UE 2500 includes a receiver 2510, a controller 2520, and a transmitter 2530.

The receiver 2510 receives DL control information, data, and messages through a corresponding channel from the base station.

The controller 2520 controls overall operations of the UE 2500 needed to perform methods of controlling transmission power of an UL data channel in the NR needed for performing the embodiments of the present disclosure described above.

The transmitter 2530 transmits UL control information, data, and messages through a corresponding channel to a base station.

The UE 2500 controlling transmission power of an UL data channel may include: the controller 2520 applying a predetermined power control different from another to an UL data channel; and a transmitter 2530 transmitting the UL data channels based on the applied predetermined power control.

The controller 2520 may apply a single transmission power control equation for the UL data channel, configure a plurality of power control parameters or parameter sets to be applied to the transmission power control equation, and control transmission power of the UL data channel based on the single transmission power control equation to which one transmission power control parameter or parameter set is applied, among the configured plurality of power control parameters or parameter sets. Details thereof are the same as those specifically discussed in the Embodiment 3-1-1.

The power control parameter(s) or parameter set(s) may be configured for the UE through high layer signaling.

Further, each parameter or parameter set to be applied to the one transmission power control equation may be independently transmitted to the UE through high layer signaling, or explicitly or implicitly indicated through physical layer control signaling.

The implicit indicating of one power control parameter or parameter set through the physical layer control signaling may be performed by the indicating of a RNTI value used for the scrambling of CRC for a physical layer control channel transmission.

The controller 2520 may define a plurality of transmission power control equations to be applied to the UL data channel and then perform a power control for the UL data channel by applying one of the plurality of transmission power control equations. Details thereof are the same as those specifically discussed in the Embodiment 3-1-2.

One of the transmission power control equations for the UL data channel may further include a power boosting related parameter.

The one transmission power control equation to be applied for the UL data channel transmission may be configured through high layer signaling, or explicitly or implicitly indicated through physical layer control signaling.

The implicit indicating of one power control equation through the physical layer control signaling may be performed by the indicating of a RNTI value used for the scrambling of CRC for a physical layer control channel transmission.

In accordance with the embodiments of the present disclosure, it is possible efficiently to control transmission power of an UL data channel in the NR.

In accordance with the embodiments of the present disclosure, it is possible to multiplex efficiently one or more UL data transmission resource(s) between UEs with different latency requirements, or efficiently control power of one or more UL data transmission resource(s) between UEs with different latency requirements, in the NR.

Examples or contents described in the Embodiments 1 to 3 may be applied to, taken alone or in combination with one another, other embodiments. For example, the multiplexing of UL data channel transmission between UEs has been discussed in the Embodiment 2, and multiple transmission power controls of an UL data channel based on reliability requirements in one UE have been discussed in the Embodiment 3. At this time, multiple transmission power controls of an UL data channel based on reliability requirements in one UE as in the Embodiment 3 may be applied, while the multiplexing of UL data channel transmission between UEs as in the Embodiment 2 is applied.

In accordance with the embodiment of the present disclosure described above, methods of controlling transmission power of an UL data channel, and transmission operations of a corresponding UE in the NR have been provided; however, the present disclosure is not limited thereto.

For example, the present disclosure includes methods of controlling transmission power of an UL data channel and transmission operations of the corresponding UE, in the NR. For example, a plurality of UL transmissions may include a PUCCH and a PUSCH, the PUCCH and a PUCCH, the PUSCH and an SRS, or the PUCCH and the SRS.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method for controlling transmission power of a physical uplink shared channel (PUSCH), performed by a user equipment (UE), the method comprising:
   applying power control for transmitting the PUSCH by:
      applying a single transmission power control equation for the PUSCH;
      configuring different types of power control parameter sets; and
      controlling the transmission power of the PUSCH based on the single transmission power control equation applied with one type of power control parameter set, among the configured different types of power control parameter sets, wherein the one type of power control parameter set is determined based on a first indication transmitted through a first downlink control information (DCI);
   monitoring a second indication transmitted through a second DCI,
   wherein the second DCI is a UE-group common DCI; and
   transmitting the PUSCH based on the applied power control,
   wherein the second indication is used to cancel an uplink (UL) transmission, and
   wherein, according to a result of the monitoring of the second indication, the transmission of the PUSCH is cancelled after a certain amount of time, the certain amount of time being based on a last symbol of a control resource set (CORESET) over which the second indication is transmitted.

2. The method according to claim 1, wherein the different types of power control parameter sets are configured for the UE through high layer signaling.

3. A method for receiving a physical uplink shared channel (PUSCH), performed by a base station, the method comprising:
   transmitting different types of power control parameter sets through high layer signaling to a user equipment (UE);
   transmitting a first indication through a first downlink control information (DCI) to the UE,
   wherein the first indication indicates one type of power control parameter set being applied to a single transmission power control equation for the PUSCH, among the different types of power control parameter sets; and
   receiving, from the UE, the PUSCH with a power to which the one type of power control parameter set is applied;
   transmitting a second indication through a second DCI to the UE,
   wherein the second DCI is a UE-group common DCI,
   wherein the second indication is used to cancel an uplink (UL) transmission, and
   wherein, according to the transmission of the second indication to the UE, a transmission of the PUSCH from the UE is cancelled after a certain amount of time, the certain amount of time being based on a last symbol of a control resource set (CORESET) over which the second indication is transmitted.

4. A user equipment (UE) for controlling transmission power of a physical uplink shared channel (PUSCH), the UE comprising:
   a controller configured to apply power control for transmitting the PUSCH, wherein the controller is configured to:
      apply a single transmission power control equation for the PUSCH and configure different types of power control parameter sets; and
      set the transmission power of the PUSCH based on the single transmission power control equation to which one type of power control parameter set is applied, among the configured different types of power control parameter sets, wherein the one type of power control parameter set is determined based on a first indication transmitted through a first downlink control information (DCI);
      monitor a second indication transmitted through a second DCI, wherein the second DCI is a UE-group common DCI; and
   a transmitter configured to transmit the PUSCH based on the applied power control,
   wherein the second indication is used to cancel an uplink (UL) transmission, and
   wherein, according to a result of the monitoring of the second indication, the transmission of the PUSCH is cancelled after a certain amount of time, the certain amount of time being based on a last symbol of a control resource set (CORESET) over which the second indication is transmitted.

5. The UE according to claim 4, wherein the different types of power control parameter sets are configured for the UE through high layer signaling.

* * * * *